United States Patent [19]
Davidson et al.

[11] Patent Number: 6,083,276
[45] Date of Patent: Jul. 4, 2000

[54] CREATING AND CONFIGURING COMPONENT-BASED APPLICATIONS USING A TEXT-BASED DESCRIPTIVE ATTRIBUTE GRAMMAR

[75] Inventors: Harold R. Davidson, Provo, Utah; Derek Penn, Incline Village, Nev.

[73] Assignee: Corel, Inc., Orem, Utah

[21] Appl. No.: 09/096,848

[22] Filed: Jun. 11, 1998

[51] Int. Cl.⁷ ........................................... G06F 9/45
[52] U.S. Cl. .................. 717/1; 709/200; 717/5
[58] Field of Search .................................. 395/701

[56] References Cited

U.S. PATENT DOCUMENTS

| | | | |
|---|---|---|---|
| 4,667,290 | 5/1987 | Goss et al. | 717/1 |
| 5,528,508 | 6/1996 | Russell et al. | 716/8 |
| 5,953,526 | 9/1999 | Day et al. | 717/1 |
| 5,970,490 | 10/1999 | Morgenstern | 707/10 |
| 6,012,098 | 1/2000 | Baych et al. | 709/246 |

OTHER PUBLICATIONS

Khare et al.; "X Marks the Spot". California Institute of Technology Computer Science Department[online]. Accessed on Oct. 22, 1999. Retrieved from the Internet:http://www.cs.caltech.edu, Jul. 1997.

World Wide Web Consortium (W3C); "Extensible Markup Language (XML) 1.0". W3C website[online]. Accessed Oct. 22, 1999. Retrieved from the Internet:http://www.w3.org, Feb. 1998.

Price, R.; "Beyond SGML". ACM Digital Library[online]. Proceedings of the third ACM Conference on Digital Libraries, pp 172–181, Mar. 1998.

Freter, T.; "XML: Mastering Information on the Web". Sun Microsystems website[online]. Accessed on Oct. 22, 1999. Retrieved from the Internet:http://www.sun.com, Mar. 1998.

Freter, T.; "Beyond Text and Graphics XML makes Web pages function like applications". Sun Microsystems website[online]. Accessed on Oct. 22, 1999. Retrieved from the Internet:http://www.sun.com, Apr. 1998.

Khare et al.; "The Origin of (Document) Species". California Institute of Technology Computer Science Department [online]. Accessed on Oct. 22, 1999. Retrieved from the Internet:http://www.cs.caltech.edu, Apr. 1998.

*Primary Examiner*—Eric W. Stamber
*Assistant Examiner*—K. Booker
*Attorney, Agent, or Firm*—Fenwick & West LLP

[57] ABSTRACT

A method for creating and configuring a component-based application through text-based descriptive attribute grammar includes creating a parse tree from an application description file, transforming the parse tree into a plurality of components corresponding to instances of classes in an application framework, and initializing and further processing the components to launch the component-based application. Additionally, a system for creating and configuring a component-based application includes a parser, a plurality of element processors, an element mapper, an attribute mapper, and a parameter converter.

24 Claims, 9 Drawing Sheets

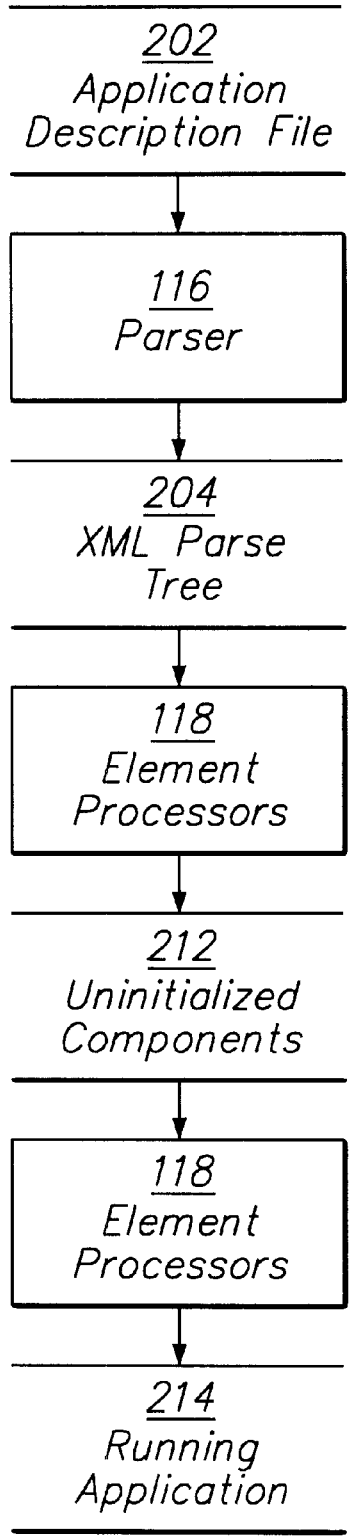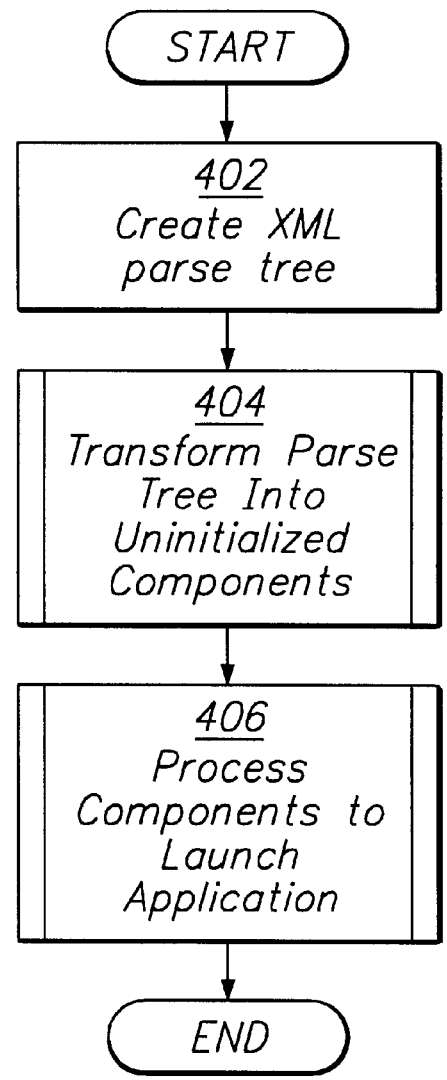
FIG. 2
FIG. 4A 6,083,276

CREATING AND CONFIGURING COMPONENT-BASED APPLICATIONS USING A TEXT-BASED DESCRIPTIVE ATTRIBUTE GRAMMAR

BACKGROUND OF THE INVENTION

1. Field of the Invention

The present invention relates generally to object-oriented programming, and more particularly, to a method and system for creating and configuring a component-based, object-oriented program using a text-based descriptive attribute grammar.

2. Identification of Copyright

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

3. Description of the Background Art

Over the last two decades, object-oriented frameworks have become increasingly important in the design and development of software applications. Designing an application with a framework of objects, or "components," promises numerous benefits, including the ability to reuse those components in a variety of different applications. Object-oriented frameworks thus reduce development times and ensure more reliable code.

The promised benefits of object-oriented frameworks, however, have not always been easy to realize in practice. In particular, specifying how different components from a framework are initialized and how they interact with each other often requires trained programmers and expertise in arcane programming languages. Creating and configuring component-based applications is often a complex, time-consuming process. The ability to quickly and easily configure component based applications without requiring extensive programming expertise has thus become a much sought after goal of framework builders and end-users alike.

Concurrently, but independently from the above, the Standard Generalized Markup Language (SGML) was conceived for "marking up" text-based structured documents in a standardized and system-independent manner using only a descriptive attribute grammar and associated document type definition (DTD). Recently, one dialect is of SGML—"HTML"—has become the dominant grammar used on the World Wide Web. Because HTML has a simple, declarative syntax, it is relatively easy for non-programmers to learn. Moreover, HTML's standardized, declarative syntax makes it extremely easy to build tools and editors that manipulate HTML files in user-friendly ways. As a result of the Web's explosive growth and HTML's relative simplicity, HTML and HTML-oriented tools have become extremely popular and widely used by a variety of technical and non-technical end-users.

In many situations, it would be highly desirable to be able to create and configure sophisticated component-based applications using only a text-based, SGML-compliant application description language such as HTML. A text-based description language for component-based applications offers many advantages. For example, the text-based data file may be edited by a simple text editor and requires no special or proprietary editing tools. Similarly, SGML compliance allows such data files to be edited, parsed, verified and analyzed by a wide variety of standardized tools. A great number of third-party applications and tools have already been built for managing and manipulating HTML-based content on the Internet. Moreover, a descriptive syntax is much easier for non-programmers to learn and use than traditional programming language constructs. By basing an application description language on a standardized descriptive syntax already familiar to a wide variety of end-users, the language would be more quickly assimilated by developers and non-programmers than a proprietary syntax or traditional programming languages.

As component-based application design has increased in importance, many attempts have been made to create application frameworks that simplify the design process. However, none of those frameworks are based on the standardized, text-based descriptive grammar described above, nor realize the advantages resulting therefrom. Examples of these attempts include the following:

(1) integrated development environments for object-oriented languages such as Smalltalk™, Objective-C, C++ and Java™, which offer developers the ability to build and design complex component-based applications in a given programming language;

(2) component-based frameworks and protocols, such as ActiveX/COM®, JavaBeans™ and CORBA, which provide standard rules and interfaces for regulating the interaction of heterogeneous components;

(3) multi-purpose "scripting" languages, such as JavaScript™, Visual Basic®, Scheme, PERL, and the like, designed to facilitate the coordination and use of existing, external components;

(4) "visual" authoring tools, such as Sun Microsystem's® Javastudio™ and Symantec's® Visual Cafe which provide "easy-to-use" graphic user-interfaces for creating and configuring component-based applications in a given object-oriented language; and (5) script-oriented "authoring tools" such as Apple's® Hypertalk or Macromedia's® Director®, which provide user-friendly environments for developing multi-media applications using the tools' built-in functionality and single-purpose, proprietary scripting languages.

Although the above systems offer solutions to a variety of development problems, none, however, allow applications to be effectively created and configured using a text-based application description language based on an SGML-compliant syntax. For example, integrated development environments, component-based frameworks, and most visual authoring tools output object-code binary files which are interpreted and executed by the user's operating system or the given language's "virtual machine." Java "applet" builders, for instance, typically generate Java source or object code directly. Such binary code files are not text-based and thus are neither editable nor accessible to text-oriented tools.

Although interpreted scripting languages such as JavaScript, Hypertalk, and Lingo can be edited in a generic text editor, their syntax is procedural rather than declarative. As a result, the semantic content of these script files can only be productively inspected and analyzed by the specific tools and editors dedicated to that particular language. In short, while there are a wealth of powerful component-oriented application frameworks and authoring tools, none of them are based on a standardized, text-based descriptive grammar or realize the advantages which accompany being based on such a grammar.

Analogously, numerous efforts have been made to extend the ability of SGML and HTML to specify more sophisticated formatting instructions. For example, HTML's pending versions include numerous processing and formatting instructions to assist developers in creating "multimedia" documents that provide basic interactivity through external "scripting" languages that control "black box" components such as Java applets and/or ActiveX components. Originally, HTML was intended as a purely descriptive syntax that would be transparently portable and easy to understand by both technical and non-technical publishers. The newly evolving hybrid-HTML attempts to expand its functionality by adding simple scripting capabilities to HTML's original descriptive tags and of creating an "open" environment for the integration of third-party components.

However, the hybrid-HTML format has a number of limitations and disadvantages. For example, since hybrid-HTML mixes procedural scripts with descriptive markup tags, a scripting code is required in order to control the behavior of objects within the HTML document. Thus, HTML publishers must understand and master procedural programming in order to take advantage of HTML's newest features. Moreover, critical semantic information is now embedded in procedural code. These procedural "scripts" cannot be inspected or parsed by generic, SGML tools and often contain instructions proprietary to a particular browser vendor.

Another disadvantage is that, in the hybrid-HTML format, each component "plug-in" is a separate and independent "black box" with its own, idiosyncratic interface to the browser's scripting language. Even components developed in a common language, such as Java-based applets, are controlled through the particular interface exposed by a specific applet. Thus, it is difficult, particularly for non-programmers, to integrate a variety of components into a single component-based application.

Yet another problem is that, although HTML tags can be used to declare attributes associated with standard browser components and user-interface controls, there is little or no coordination between the structure of the markup tags and the underlying data structures employed by the browser application itself. For example, HTML elements do not "inherit" properties from "superclass" elements. Thus, hybrid-HTML does not provide a sufficiently sophisticated architecture to integrate large-scale component-based applications.

Finally, hybrid-HTML is limited by the rigidity of HTML itself. By design, HTML only allows for a fixed set of element and attribute tags. There is no provision for developers to add new functionality through application-specific element tags or attributes. Nor is there any ability to map new element tags to new components or to extend the functionality of the browser application through code-based subclassing. Fundamentally, HTML was designed and is still used as a document markup language that is "processed" by an autonomous application: the browser. The intent and design of HTML was to provide a standardized format for marking up "multimedia" documents. All sophisticated application processing is delegated to external resources, i.e. scripting languages, embedded "applets", server-side applications, and the like. Consequently, HTML-based browsers were not designed to actually create and configure a component-based application through descriptive tags alone.

The Extensible Markup Language (XML) proposal recently submitted to the World Wide Web Consortium (W3C) attempts to loosen some of these restrictions on HTML in order to create a simple, declarative syntax that can be used for a wider variety of data-oriented files. In particular, XML allows developers to add new element tags and attributes as long as these comply with the XML specification. Current initiatives using the proposed XML standard include Microsoft's "Channel Definition Format", Netscape's "Meta-Content Framework", and Peter Murray-Rust's "Chemical Definition Language."

While attempts have been made to integrate XML with such object-oriented applications and languages such as Java, C++, and Tcl, existing systems offer only a rudimentary parameterization of the resulting components and require external scripting or programming code in order to provide more sophisticated interactivity. XML has the flexibility and simplicity to provide the syntactic framework for configuring component-based applications. No existing method or system, however, has effectively tapped XML's potential.

What is needed, then, is a method and system for creating and fully configuring component-based applications using a text-based XML-compliant grammar. Moreover, what is needed is a system and method for modeling the component structure of an application through a declarative syntax, such that the component model instantiated by the application mirrors the element tag structure of the original application description file. Additionally, what is needed is a means for specifying the user-oriented interactive behavior of an application in purely descriptive form without resorting to procedural or functional language. Moreover, what is needed is a means for expressing how a component should respond to events within the limits of the XML syntax. Similarly, what is needed is a system and method that permits custom event messages to be created and processed at runtime by components without any special underlying support code on the part of the component. In addition, what is needed is means for specifying complex inter-component behaviors within the limits of a descriptive grammar and without resorting to procedural or functional language. Moreover, what is needed is a means for dynamically specifying the component types used by the application such that new component classes and functionality may be added to the system at runtime. Additionally, what is needed is method for referencing any given component in the application through a scoped, text-based name mechanism. What is also needed a system and method for dynamically controlling and interacting with any of the components of the given application through a single, top-level method call that takes only character arrays as its parameters.

SUMMARY OF THE INVENTION

The present invention overcomes the various limitations of the prior art by providing a method and system for creating and configuring a component-based application through simple, XML-compliant, text-based document. In accordance with a preferred embodiment of the present invention, a parse tree is created from an application description file. Thereafter, the parse tree is transformed into a plurality of components corresponding to instances of classes in an application framework. The components are then initialized and further processed to launch the component-based application.

Additionally, in accordance with a preferred embodiment of the present invention, an system for creating and configuring a component-based application includes a parser, a plurality of element processors, an element mapper, an attribute mapper, and a parameter converter.

BRIEF DESCRIPTION OF THE DRAWINGS

FIG. 2 is a high-level dataflow diagram of a system in accordance with a preferred embodiment of the present invention;

FIG. 4A is a high-level flowchart for a method of creating and configuring a component-based application in accordance with a preferred embodiment of the present invention;

DETAILED DESCRIPTION OF THE PREFERRED EMBODIMENTS

A preferred embodiment of the present invention is now described with reference to the Figures, where like reference numbers indicate identical or functionally similar elements. Also in the Figures, the left most digit of each reference number corresponds to the Figure in which the reference number is first used.

System Architecture

Figure 1:
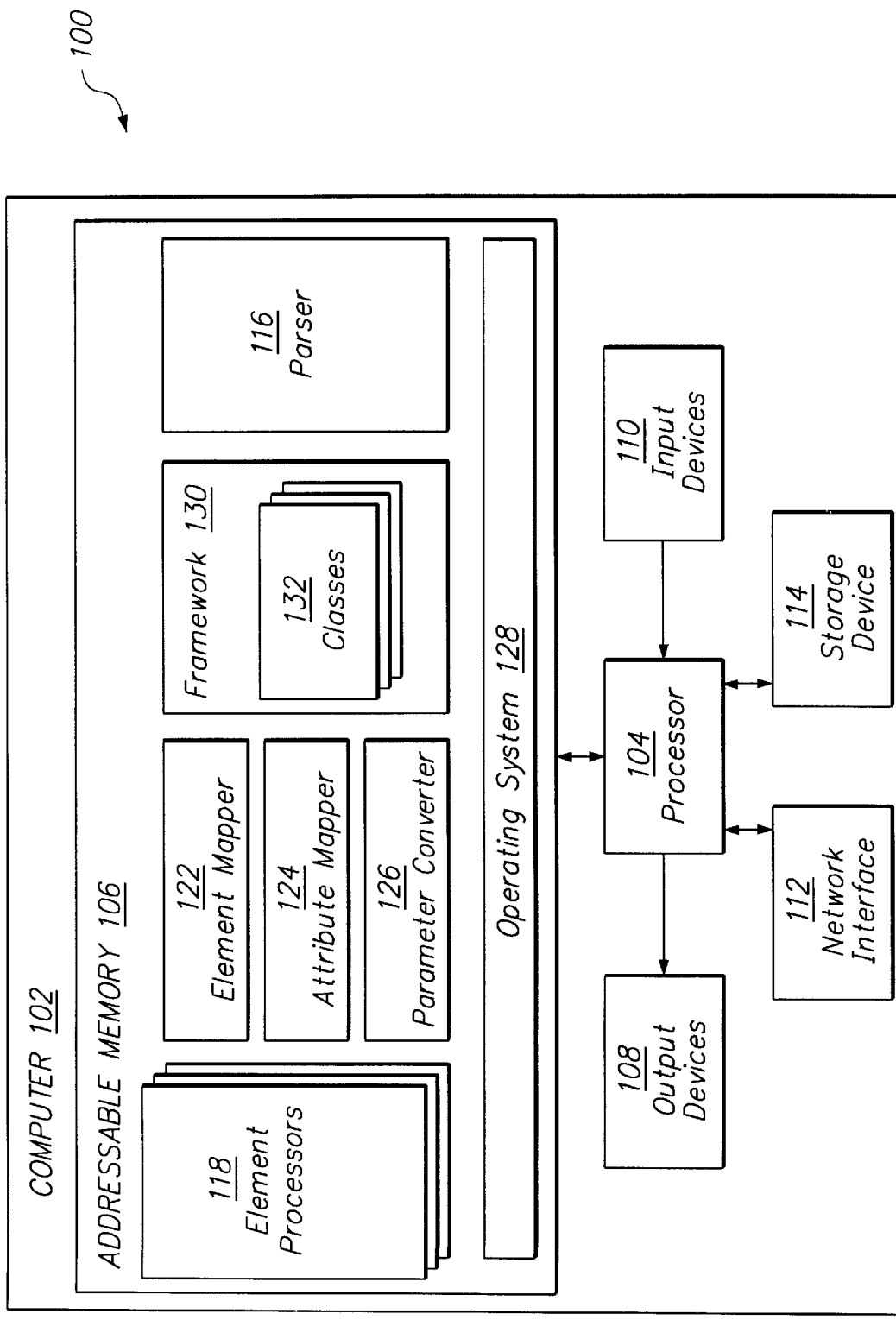
FIG. 1 is a block diagram of a system for creating and configuring a component-based application in accordance with a preferred embodiment of the present invention.

Referring now to FIG. 1, there is shown a block diagram of a system 100 for creating and configuring a component-based application in accordance with a preferred embodiment of the present invention. In one embodiment, the system 100 includes a computer 102, having a processor 104, addressable memory 106, output devices 108, input devices 110, a network interface 112, and a storage device 114.

The computer 102 is preferably a general purposes computer, such as an IBM PC or compatible machine. Thus, the processor 104 may include an Intel® Pentium® II or similar microprocessor. The memory 106 is implemented by a standard memory device, such as a random access memory (RAM). The output device 108 includes a CRT display, printer, or other suitable output device. The input device 110 includes a standard keyboard, mouse, or other similar input device. The network interface 112 is implemented as a conventional Ethernet adapter or other suitable interface. The storage device 114 includes a hard disk drive, CD-ROM, magneto-optical drive, DVD, flash memory, or other mass storage device. It should be recognized, however, that a number of alternative physical devices and implementations could be readily used without departing from the spirit of the invention.

In one embodiment, the memory 106 is used to store a number of software objects or modules, including a parser 116, a plurality of element processors 118, an element mapper 122, an attribute mapper 124, and a parameter converter 126. Throughout this discussion, the foregoing modules are assumed to be separate functional units, but those skilled in the art will recognize that the functionality of various units may be combined and even integrated into a single software application or device.

The processor 104 executes the parser 116, the element processors 118, the element mapper 122, the attribute mapper 124, and the parameter converter 126, including all of the operations thereof. In addition, the processor 104 executes a general purpose operating system 128, such as Windows 95, available from Microsoft Corporation of Redmond, Wash.

In a preferred embodiment, the object modules in the memory 106 are implemented using an object-oriented programming language such as Java, available from Sun Microsystems of Mountain View, Calif. The Java programming language was designed to allow component-based applications to be developed that are safe, platform-independent, robust, and dynamically instantiable. Consequently, Java provides a full-fledged, object-oriented programming language with single inheritance, class- and package-level encapsulation, strong data typing, garbage collection, dynamic class loading and run-time binding. One skilled in the art, however, will recognize that other languages providing similar functionality may also be used without departing from the spirit of the invention.

Additionally, an application framework 130 is provided, which includes a plurality of classes 132 in Java or another suitable object-oriented language. In one embodiment, the application framework is "JavaBeans," which is a specification for a standardized Java-based application framework designed by Sun Microsystems. The JavaBeans specification is a standard set of Application Program Interfaces (API's), and facilitates interoperability of "Bean" components through a standardized set of "metadata" queries. However, one skilled in the art will recognize that other frameworks could be used within the scope of the present invention.

System Dataflow

Referring now to FIG. 2, there is shown a high-level dataflow diagram of the system 100 in accordance with a preferred embodiment of the present invention. The parser 116 receives an application description file (ADF) 202, which, in one embodiment, resides in the storage device 114. Alternatively, the ADF 202 is generated externally by a software object, a server, or the like. Preferably, the ADF 202 is an XML-compliant text document that defines a component-based application using a descriptive attribute grammar. Two embodiments of an application description language (ADL) for the ADF 202 are detailed below.

The parser 116 parses the ADF 202 to generate an XML parse tree 204. Preferably, the parse tree 204 is stored in the memory 106 as a set of interconnected objects, although a variety of other configurations are possible within the scope of the invention. In one embodiment, the parser 116 is a conventional XML parser available from Microsoft and other sources. Alternatively, a custom-designed XML parser is used. The ADF 202 and the parse tree 204 are described in greater detail below with respect to FIG. 3A.

Thereafter, the parse tree 204 is transformed by the element processors 118 into a plurality of uninitialized components 212. In one embodiment, the components 212 are "bean" objects in the JavaBeans application framework 130. The process of mapping elements 306 to components 212 is discussed below in greater detail with reference to FIG. 3B.

After the components 212 are created, the element processors 118 process the uninitialized components 212 to launch the component-based application 214. As will be described in greater detail below with reference to FIGS. 3C and 4D, this is accomplished in one embodiment by initializing each of the components 212 and adding each child component 212 to its parent component 212.

Figure 3A:
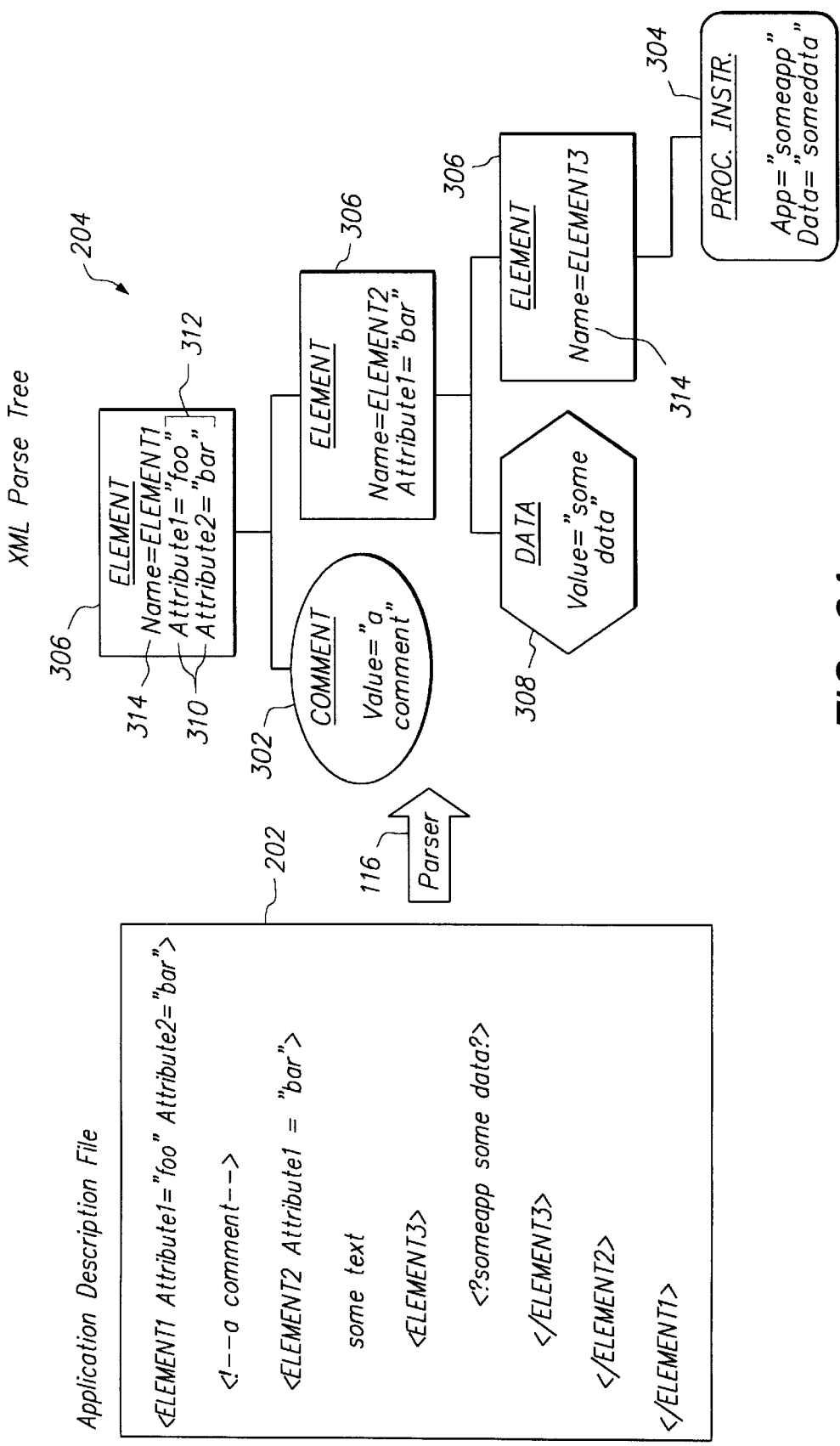
FIG. 3A is a dataflow diagram of parsing an application description file in accordance with a preferred embodiment of the present invention.
Figure 3B:
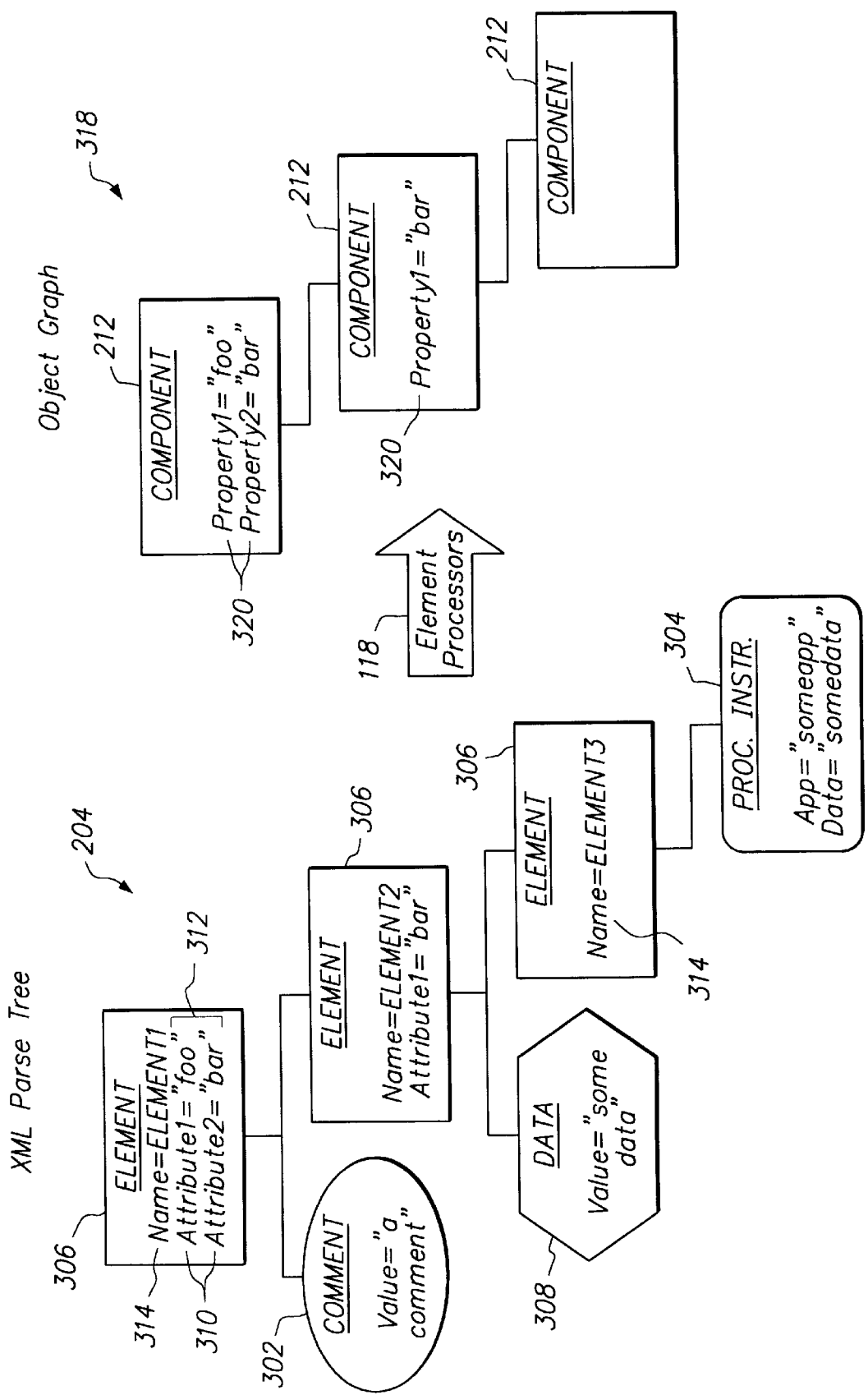
FIG. 3B is a dataflow diagram of tranforming elements into component instances in accordance with a preferred embodiment of the present invention.
Figure 3C:
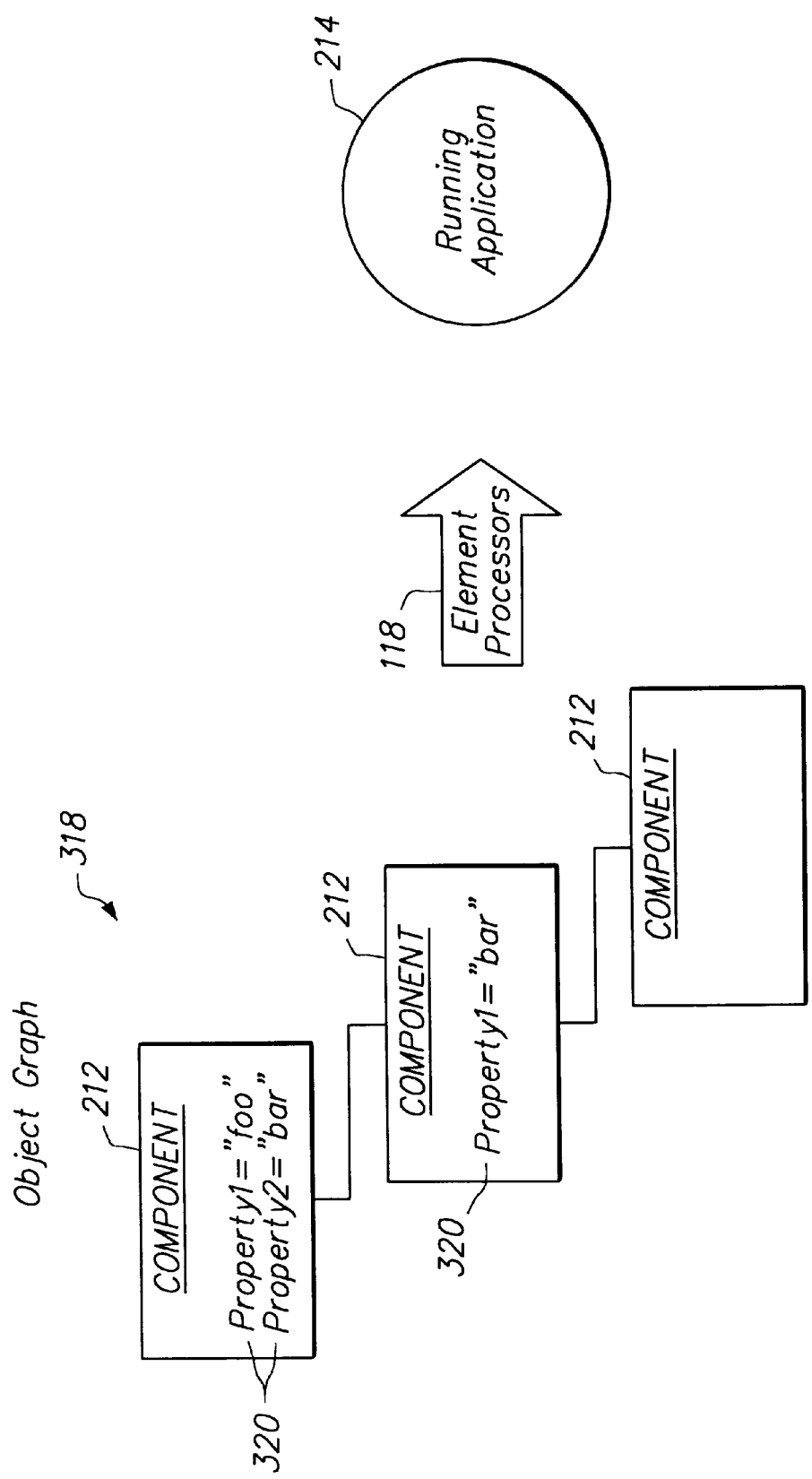
FIG. 3C is a dataflow diagram of processing component instances to launch a component-based application in accordance with a preferred embodiment of the present invention.

Referring now to FIGS. 3A–C, there is shown a more detailed representation of the dataflow of the system 100 in accordance with a preferred embodiment of the present invention. FIG. 3A illustrates the process of parsing the ADF 202 into the parse tree 204. An exemplary ADF 202 is provided, showing one embodiment of a descriptive attribute grammar. In a preferred embodiment, the parser 116 uses recursive techniques to generate the parse tree 204, which is preferably a set of interconnected objects in the memory 106.

In one embodiment, the leaves or nodes of the parse tree 204 are of four basic types, corresponding to the four types of data in the ADF 202:

comments 302 (delimited in the ADF 202 by <!-- and -->), processing instructions 304 (delimited by <? and ?>).

elements 306 (all other constructs delimited by < and >), and raw data 308.

The comments 302 are used for internal documentation of the ADF 202, and do not affect the operation of the system 100. Similarly, the processing instructions 304 are used to communicate with external applications and are not crucial to understanding the present invention.

The elements 306, however, comprise the primary structures of the ADF 202, and, as described below, are associated with components 212 in the application framework 130. Each element 306 has a name or "tag" 314 by which the element 306 is defined in the ADF 202. Only elements 306 can have children, which can be any of the four types discussed above. Additionally, the elements 306 may contain attributes 310, which correspond to properties of a component 212. The attributes 310 and their values are parsed by the parser 116 and placed in an attribute list 312 within the element 306.

FIG. 3B illustrates process of transforming the parse tree 204 into a plurality of components 212. In one embodiment, the set of components 212 is represented by an object graph 318, which preserves the hierarchical structure of the parse tree 204. The element processors 118 transform the parse tree 204 into uninitialized components 212, the process of which is described below.

By recursive descent of the parse tree 204, an element processor 118 is created for each of the elements 306. Each element processor 118 knows the meaning of its corresponding element 306, and understands how to process the element's attributes 310 and child elements 306, as well as the proper syntax for each. In one embodiment, a different element processor 118 is provided for each type of element 306. Alternatively, only a few "core" element processors 118 are provided, and the default component class 132 is overridden with a particular target component class 132. A variety of element types are possible, and examples are provided hereafter with respect to various embodiments of an application description language (ADL).

The element mapper 122 is used to select the appropriate element processor 118 for a given element 306. In one embodiment, the element mapper 122 is an object that maps the element's name or tag 314 to the corresponding ("target") class 132. Thereafter, the element processor 118 instantiates an object or component 212 of the target class 132. Additionally, an object called an attribute mapper 124 is used to map attributes 310 associated with the element 306 to properties 320 of the component 212.

FIG. 3C illustrates the processing of the components 212 in the object graph 318 to launch the component-based application 214. As will be described in greater detail below with reference to FIG. 4D, this is accomplished in one embodiment by initializing each of the components 212 and adding each child component 212 to its parent component 212.

Specifications for an Application Description Language

As noted above, the ADF 202 is preferably an Extensible Markup Language (XML) compliant text file that defines a component-based application using a descriptive attribute grammar. In a preferred embodiment, the ADF 202 conforms to an application description language (ADL) as described below. One skilled in the art will recognize that a variety of ADLs may be used within the scope of the present invention. Thus, the syntax of the ADL may vary without departing from the spirit of the invention.

Definition of an ADL "Document"

For purposes of following description, documents are data objects which contain text data made up of "characters" as defined by the XML specification. The physical storage characteristics of a document is irrelevant to its processing. As with any XML document, ADL documents have a logical structure, which includes element 306 declarations, attributes 310, comments 302 and character data 308 whose structure is specified through "markup" tags 314 in compliance with the XML specification.

Two exemplary ADLs are presented below. The first is called "BML." The second conforms to both "well-formed" and "valid" XML, and is called hereafter "ADML."

1. BML

"Well-formed" ADL Documents

The definition of a well-formed ADL document is similar to that for a well-formed XML document. A well-formed ADL document 1) contains one or more elements 306; 2) has one root document element 306 which encompasses all other elements 306 in the given document; and 3) is structured such that all elements 306 other than the root documents are entirely contained within a single parent element 306.

In the currently preferred embodiment, the root document element is delimited through a pair of <BODY> and </BODY> tags. Well-formed BML documents do not require document type declarations (DTDs) or document version information. The following is a rudimentary but well-formed BML document:

```
<Body>
<Rect Xpos=50 Ypos=50 Width=200 Height=100 BGColor=Red>
</Body>
```

Character Data and Markup

Like standard XML documents, BML documents consist of markup data and content character data within specific elements' closures. Valid markup structures allowed by BML include start-tags, end-tags, empty elements, character references, comments and CDATA sections. The current preferred embodiment of BML does not support processing instructions 304, document type declarations or entities though these could be easily added if appropriate in other embodiments. Comments 302 in BML are marked and processed identically to XML documents and are, therefore, ignored by parser 116. As with XML, BML comments 302 may not appear within declarations or tags.

Element and Attribute Declarations

Like XML, BML documents contain one or more elements 306. Elements 306 are declared and delimited by a start-tag and end-tag. Like XML, the name 314 in an element's end-tag matches the name in its start-tag. Empty elements 306 in BML may be specified using the standard XML "empty element" tag. Unlike XML, BML does not require the special "empty element" tag. The following are allowable as valid empty BML elements 306:

```
<Foo Att1=Value1 Att2=Value2>
<Bar Att2=Value2 />
```

As with XML, the first character data inside an BML start tag is a valid element name or tag 314 which defines the element's type. Each element may have one or more attributes 310 which are declared in precisely the same name-value syntax as standard XML attributes. For example, in the "foo" empty element tag 314 above, the attribute 310 name "Att1" is set to the value "Value1," and the attribute 310 "Att2" set to the value "Value2".

BML attribute 310 names correspond to the constraints of XML attribute names. Unlike XML, BML does not require quote characters for attribute 310 values with no embedded white space characters. For example, the following are valid BML elements 306:

```
<Foo Att1=Value1>
<Foo Att1="Value1">
<Foo Att1="A Value With Spaces">
```

Unlike XML, BML does not disallow duplicate attributes 310. In other words, attributes 310 may appear more than once in the same start-tag. For example, the following is a valid BML element:

```
<Foo Att=1 Att=2 Att=3>
```

Only certain BML elements 306 may have child elements 306. Whether or not a given element type can contain children is not a property of the BML syntax itself but is determined solely by the properties of the underlying component class 132 to which the element name 314 is mapped. In general, only component classes 132 that implement a specific "container" interface may have children element tags 314 as will become apparent hereafter.

The following is valid as an element tag 314 with children if "Fizz" is mapped to a "container" component 212 interface:

```
<Fizz Att1=Value1>
    <Foo Att1=Value3>
    <Foo Att1=Value4>
</Fizz>
```

All BML attribute 310 values are input and parsed as string data. The parser 116, however, allows these string-based values to be parsed into primitive and object data types according to the parameter specifications of the attribute's corresponding mutator. Allowable basic parameter types include: string, double, boolean, date, integer, and arrays. Parameter types may be extended at runtime by individual components and element processors. In addition, BML allows a special string-based parameter type called a "named object reference," which will be discussed in greater detail hereafter.

As with XML, BML element 306 and attribute 310 names are case insensitive. Attribute 310 values, however, may be case sensitive depending on the parameter type specified by the underlying component 212 method. Before attribute 310 values are passed to the underlying component 212, trailing and leading white space is removed unless explicitly declared within a pair of quotations.

Event Declarations

One object of the present invention is to provide a mechanism for defining complex component-based interactions within the limits of a descriptive attribute grammar. Thus, BML provides a special attribute 310 declaration, OnEvent, for specifying both user and application-generated "events". The OnEvent attribute 310 is used to define how a component 212 should "react" to specified event types as well as how event "messages" may be posted among the components 212 themselves.

The syntax for the OnEvent attribute 310 declaration requires a single string value with comma-separated fields as follows:

OnEvent=[Event Tag], [Action], [Target], {Parameter}

In one embodiment, the Event Tag field is required and may correspond to either a component-specific event tag (e.g. "MOUSEUP", "MOUSEENTER", etc) or to a custom event tag used among components in the application (e.g. "IMPORTANTEVENT", "aCustomEventTag", etc). The Action field is also required and should correspond to a valid, publicly accessible method on the target component 212. Preferably, Event tags and Action fields are both case insensitive. Similarly, the Target field is required and should be a scoped name reference to a component 212 accessible from the base component 212. The Parameter field is optional. Any text data after the Target field is treated as a single string and part of the Parameter field. The raw parameter string is not converted to any appropriate data type until the associated action message is executed.

Validation of the BML File

Unlike typical XML or SGML files, a BML file cannot be validated by reference to a pre-existing DTD. Instead, the validity of an BML file can only be determined in a specific application context and in reference to the component object model specified by the BML file. In a valid BML file, the resulting object model should have the following characteristics:

(1) each element 306 declaration in the BML file should be capable of being mapped to a corresponding application component class 132;

(2) each element 306 with children should result in a corresponding "container" component 212 with analogous children components 212;

(3) each attribute 310 declaration should be mapped to a corresponding property 320 value in the corresponding component 212 unless special processing for that attribute name has been specified; and (4) all "Event Declarations" should be mapped to equivalent event-based "triggers" in the underlying components 212.

While transforming the elements of parse tree 204 into components 212, the element processors 118 are able to detect whether the four requirements above are met. Specifically, it can be determined whether a corresponding component class 132 exists for the specified element 306 and whether the attribute 310 declarations have a corresponding property 320 value. Thus, in a preferred embodiment, the element processors 118, in combination with the parser 116, may validate an BML file.

2. ADML

ADML has a more restricted syntax than BML, which allows a document to be validated against a document type definition (DTD). The main difference between ADML and BML is that the names of tags 314 and associated attributes 310 in ADML are fixed and cannot be added to. Thus, by allowing only certain tags 314 and certain attributes 310 for those tags, a DTD may be defined, and ADML is XML in the strictest sense, being both "well formed" and "validating" XML. A DTD for ADML is attached as Appendix A and is described in detail below.

The ADML DTD

A DTD is a special document that describes the syntax of a markup language. The XML specification requires that the processor of a dialect of XML have a DTD and enforce the syntax in order to be considered "validating" XML. ADML's syntax is enforced by the ADML runtime. Appropriate error messages are generated when a ADML fails to conform to the DTD's rules. To fully understand the document type definition of ADML in Appendix A, the following should be noted:

--- an ELEMENT declaration declares the syntax for a specific element 306. It declares the name of a tag 314 in the syntax, and what child tags 314, if any, it may have, and in what order.
    If the word EMPTY is placed at the end of an ELEMENT declaration instead of a list of child tags 314, that means that the tag can have no attributes 310. An example is the CONSTANT tag in ADML.
    A #PCDATA child means that the tag 314 may contain child text. An example is the P tag 314.
    Lists of child tags 314 may contain "entities" or macros that contain a predefined list of child tags 314. These entities may in turn contain other entities. An example is the EVENT tag 314 whose children are defined in the actions entity.
    If there is a list of child tags 314 separated by commas, the child tags 314 should occur in that order. An example is the ADML tag 314 at the beginning of the document, under which the BODY tag should follow the HEAD tag 314.
    If there is a list of child tags 314 separated by a vertical bar "|", any one of the tags 314 in that list may be used in that position. An example of this is in the HEAD tag. Note that in this case, the list is followed by a *, which modifies the rule as described hereafter.
    A ? after a child tag 314 means that it is optional. Examples are found in the CALL tag 314, for which the ON and ARGUMENTS child tags 314 are optional.
    A + after a child tag 314 means that there must be at least one of that tag 314 there, but there may be more than one. An example is the TEXT tag 314, has one or more child P tags 314.
    A * after a child tag 314 means that it is optional, and there may be more than one. An example is the PARAMS tag 314, which may have 0 or more child PARAM tags 314.
    Several marks can be used in combination to express more complex rules, for example,
        (A?, B?, C?) means that child tags 314 A, B, and C are all optional, but they if they exist, there may only be at most one of each, and they should appear in that order.
        (A*, B*) means that all A tags 314, if any, should appear before all B tags, if any.
        (A|B)* means that there may be a sequence of 0 or more A's and B's, in any order.
There may or may not be a corresponding ATTLIST 312 declaration for the same tag 314. When the ATTLIST 312 does not exist, the tag 314 may not have attributes 310. When it does exist, it defines exactly what attributes 310 there may be, what their format is, and which must be there. It can also specify a default value for the attribute 310. An example of an ELEMENT 306 with an ATTLIST 312 is REQUEST. An example of an ELEMENT 306 without one is HEAD. There is no concept of ordering in attributes 310. A given attribute 310 may only be used once in a tag 314.
The attribute list 312 may contain an entity macro specifying a list of attributes 310 declared elsewhere. An example is the STYLE tag 314 whose attributes 310 are defined by the styleattr entity.
    An attribute 310 may be required. An error will be generated if the attribute 310 is missing. An example is the Type attribute 310 of EVENT.
    An attribute 310 may be optional. An example is the ARGUMENTS tag 314, for which the Classes attribute 310 is optional.
    DTDs have difficulty expressing certain rules. For example, they cannot express the rule that "either attribute a or attribute b must be present." When that is the case, all that the DTD can say is that both are optional. An example is the CONSTANT tag 314, where either a Value attribute 310 or an IDRef attribute 310 must be present. In cases such as this, the runtime will generate an error. The error message will show the location in the source where the error occurred. Another rule that the DTD cannot express is "attribute a and child tag A cannot both be present". An example is the TYPE tag 314 and the <COMPONENT>, <CONTAINER>, <BEAN> family of tags 314 that can optionally specify a value through either the Value attribute 310 or the VALUE child tag 314, but not both. Because of limitations such as these, the runtime is more strict than the DTD.

---

Types

In BML, the tag 314 name is used to identify the type of the component or "bean" 212. For instance, the <BUTTON> tag 314 is used to declare a button. Creation of new tags 314 is not permitted in ADML. Thus, the BML expression <BUTTON> is replaced by the ADML expression <COMPONENT Type="BUTTON">. COMPONENT is one standard tags 314 for declaring a bean 212, as described below. Although there are several different tags 314 in ADML for creating a bean 212, all are told what kind of bean 212 to create with a Type attribute 310, whose value should be the ID of a TYPE tag declared in the HEAD of the document. The standard types that are provided with the runtime can be found in a StandardHeader.ent file. These standard types do not have to be used, and can be replaced with custom designed types, but care must be taken that there is a TYPE for each bean's 212 Type attribute 310 or default type.

If the Type attribute 310 is missing in a bean tag 314, the runtime will look for a TYPE whose ID is the name of the bean's tag 314. For example, if a bean is declared using a CONTAINER tag 314, but no Type is specified, the runtime will look for a TYPE in the HEAD section called "CONTAINER".

An example of the differences in syntax between BML and ADML is illustrated below. For instance, a BML document might take the form:

```
<FRAME background="white" >
    <BUTTON font="timesroman-plain-14"
            background="blue" />
</FRAME>
``` whereas the same document in ADML would have the form:

```
<CONTAINER>
    <INIT>
        <SET Name="background" Value="white" />
    </INIT>
    <COMPONENT Type="BUTTON">
        <INIT>
```

-continued

```
        <SET Name="font" Value ="timesroman-plain-14" />
        <SET Name="label" Value="Press Me" />
    </INIT>
  </COMPONENT>
</CONTAINER>
```

Inheriting Types

In some situations, an existing type may be almost the desired type, but not quite. A user may be satisfied with the BUTTON type in the StandardHeader.ent file, but want to change the Tag, Class, Value, or Processor attributes. For example, a BUTTON type can normally only be used in a COMPONENT tag 314, because the Tag attribute 310 of the BUTTON type says "COMPONENT". Recognizing that the StandardHeader.ent file specifies a Swing JButton as the Class for the BUTTON type, if the user wants to take advantage of the fact that Swing buttons are actually containers, the user could create a type identical to BUTTON but usable in a CONTAINER tag 314. The user would create a new tag 314 derived from BUTTON and name it something new, such as:

```
<TYPE ID="CONTAINERBUTTON" Type="BUTTON"
    Tag="CONTAINER"/>
```

INIT Macros

An INIT section can be associated with a TYPE. All beans 212 declared with that type will have all of the contents of that INIT section executed when the bean 214 is created. This can be used to set up default bean property 320 values for a type. For example, the BUTTON type in the StandardHeader.ent file might have an INIT section that sets the opaque property on the JButton to "true," because the user did not want all the buttons to be transparent. Thus, any component 212 whose type is BUTTON will be opaque. When a type is inherited, it inherits all of the inits from above, but the derived type will execute its inits last, allowing it to override the inits of a parent type. The bean's own INIT section is likewise executed after all inits inherited from the TYPE.

EVENT Macros

Similar to INIT macros, event-handling macros can be specified to create default behavior for an object 212 of the given type. For example, one could create a button type that responds to "mouseEntered" and "mouseExited" event tags to create buttons that become brighter when the mouse passes over them. Like INIT macros, derived types' event handlers execute after parent type's event handlers, and event handlers attached to the bean tag are executed last of all.

START and STOP Sections

There may also be default START and STOP sections for a type. These are used to specify start and stop behavior for all beans 212 of that type. For example, the animation in an Animator bean 212 could be started and stopped so that whenever the bean 212 becomes invisible, the animation automatically stops, thus saving CPU time.

Tags for Bean Creation and Declaration

There are several tags 314 which create and declare bean components 212 in the ADML language. While, for the most part, they share a similar syntax, each tag has different semantics. In one embodiment, the tags include BEAN, COMPONENT, CONTAINER, BODY, TEXT, STYLE, P, LAYOUT, and POSITION.

BEAN - creates a bean 212 object, allows it to be named, and specifies event handling for that bean. A BEAN 212 will not be laid out inside of its parent, even if its bean 212 is derived from java.awt.Component.

COMPONENT - like BEAN, but the bean 212 should be an instance of java.awt.Component, and it will be laid out inside of a parent CONTAINER or BODY and may specify a POSITION to specify a layout constraint. Inside a P or STYLE, it is treated as a character, and the layout constraint is ignored.

CONTAINER - like the COMPONENT in most respects, but the bean 212 should be an instance of java.awt.Container. It can also contain child components. It can also use a LAYOUT tag to create a layout manager to layout its children. Child tags 314 can refer to their container with the "_PARENT" ID.

BODY - creates a container to hold all of the contents of a BML file. Similar to CONTAINER but it cannot have a POSITION. The body's container object can be referred to elsewhere using the "_BODY" ID.

TEXT - creates a text component 212.

STYLE - creates a text style within a paragraph object. It can be used to create hypertext links. It can contain text. Child components 212 will be treated as characters. It has attributes that apply to the text inside the style. Methods on the style can be used to change the text inside of it.

P - creates a paragraph object within a text component 212. It can contain STYLE tags and text. Child components 212 are treated as characters. It has attributes that apply to paragraphs, such as justification.

LAYOUT - creates a LayoutManager (as described in the next section).

POSITION - creates a constraint object for the specified LayoutManager (as described in the next section).

Most of the foregoing tags share the following common features:

They may have a Type attribute 310.

They may have an ID attribute 310 (called "Name" in BML) used to refer to that bean in expressions elsewhere. Any time it needs to refer to itself, it may use the "_SELF" ID.

They may have a Value attribute 310 which specifies a literal value for the bean 212. When this is present, the Class attribute 310 of its TYPE is used to convert the Value to the actual bean 212 for that tag 314 using ADML's built-in conversion mechanism 126. This attribute is not permitted when there is a VALUE child tag 314.

They may have a VALUE child tag 314 which contains an expression for creating the bean 212, if the default constructor for the bean 212 is not sufficient. This is described in more detail below. No forward references are allowed here (i.e. objects below the closing tag 314 of the parent of the VALUE tag are not visible yet. Because children of the parent are processed before the parent, ID's of the VALUE's preceding sibling tags are visible). This tag 314 is not permitted when there is a Value attribute 310 for the bean 212.

They may have an INIT section, which is used to perform initialization such as setting bean properties 320. Unlike BML, forward references are possible here (i.e. all tag ID's are visible).

They may have START and STOP sections. These are used when the parent frame gets a start and stop message. Typically, if the ADML page were inside an Applet, they would be connected to its start() and stop() methods. Inside an application, START is invoked whenever the frame becomes visible, and STOP is invoked whenever the frame becomes invisible.

They may have EVENT sections. An EVENT section has a Type attribute 310 which specifies the desired listener method to which the ADML runtime should respond. ADML has built-in listeners for all AWT event types as well as all JFC events. New ones can be registered with the LISTENER tag in the HEAD section. The event types are the names of the listener methods a listener. For example, "mousePressed" and "mouseReleased" are two event types in ADML, as are all of the other method names from the java.awt.event.MouseListener interface.

Using the <LAYOUT> Tag

In general, a LayoutManager is a helper object that is associated with a Container that tells the container how to arrange its children within its area. Because they are objects, ADML allows them to be created and initialized using the same constructs as other beans 212. They are declared using the LAYOUT tag. The Type attribute 310 is used to identify which layout manager is being created. Like other beans 212, they can be configured using VALUE and INIT tags 314. If no LAYOUT is specified for a CONTAINER, the Container's default layout manager will be used (this will usually be FlowLayout). If LAYOUT is used, a Type should be specified, because it has no default type. Layout Types, like any other types, are specified in the HEAD section of the document. Some examples of the foregoing include:

```
<TYPE ID="FlowLayout" Tag="LAYOUT"
Class="java.awt.FlowLayout"/>
<TYPE ID="BorderLayout" Tag="LAYOUT"
Class="java.awt.BorderLayout"/>
<TYPE ID="CardLayout" Tag="LAYOUT"
Class="java.awt.CardLayout"/>
<TYPE ID="GridLayout" Tag="LAYOUT"
Class="java.awt.GridLayout"/>
<TYPE ID="GridBagLayout" Tag="LAYOUT"
    Class="java.awt.GridBagLayout"/>
```

To use a declared layout type, its ID should be specified in the LAYOUT tag's Type attribute. For example, to use ADML's layout manager, the RLayout type declared in StandardHeader.ent should be used thus:

```
<CONTAINER>
    <LAYOUT Type="RLayout" />
</CONTAINER>
```

Using the <POSITION> Tag

A POSITION specifies the information, called "constraints", that constraints-based LayoutManagers need for a child of the container in order to know how the child is to be laid out. For example, ADML's built-in layout manager calls for one of three kinds of objects. The most useful one is used to specify relative positioning. Its Type, declared in StandardHeader.ent, is "RPosition". BorderLayout, on the other hand, requires a String.

The RPosition type currently only supports the relative positioning portion of BML's built-in layout manager. It implements all of the BML layout attributes except x, y, width and height. RAbsolute and RPreferred are two other less common constraints types accepted by RLayout.

If no POSITION tag is specified for a child, it is up to the LayoutManager to determine how to deal with the child. For example, if the RLayout type is used, and no POSITION is given for a child, the child will be stretched to fill the entire container.

Because some LayoutManagers use Strings as constraints, String has been set up as the default type for a POSITION (if StandardHeader.ent is used). Therefore, if a POSITION tag with no Type is specified, the parent's LAYOUT should accept Strings for its constraints.

Bean Creation Expressions

Like Sun's beanbox, BML is limited to using the default constructor for a bean 212. ADML, on the other hand, allows a user to specify an expression for creating the bean 212. This expression can be a call to a non-default constructor (i.e. a constructor with arguments), a "factory" method that produces objects, or a CONSTANT value such as a String or a Color, an ARRAY, or the like. The following example uses a constructor for a JButton that takes a single Icon argument:

```
<COMPONENT Type="BUTTON" ID="HANKBUTTON">
    <VALUE>
        <REQUEST METHOD="new" OnClass="com.sun.java.swing.JButton">
            <ARGUMENTS>
                <REQUEST Method="new"OnClass="com.sun.java.swing.ImageIcon">
                    <ARGUMENTS>
                        <REQUEST Method="new" OnClass="java.net.URL">
                            <ARGUMENTS>
                                <CONSTANT
                                    value="http://users.itsnet.com/~hank/images/hank.gif"/>
                            </ARGUMENTS>
                        </REQUEST>
                    </ARGUMENTS>
                </REQUEST>
            </ARGUMENTS>
        </REQUEST>
    </VALUE>
</COMPONENT>
```

The Method="new" tells the runtime to call a constructor. A Bean creation expression can be specified as part of a TYPE. The following example creates a type called SpecialButton. Components 212 of that type will be buttons that contain the text, "Click Me!". It calls the constructor for JButton that takes a single String argument.

```
<TYPE ID="SpecialButton" Tag="COMPONENT" Class=
    "com.sun.java.swing.JButton">
<VALUE>
    <REQUEST Method="new" OnClass="com.sun.java.swing.JButton">
        <ARGUMENTS Classes="java.lang.String">
            <CONSTANT Value="Click Me!"/>
        </ARGUMENTS>
    </REQUEST>
</VALUE>
</TYPE>
```

Expression Handling Tags in BML and ADML

Table 1 provides a summary of expression handling tags in both BML and ADML.

TABLE 1

| PURPOSE | In BML | In ADML |
|---|---|---|
| Calling a function on an object when a value is called for, and passing in a single literal value | <FUNCTION Selector="methodName" Target="SomeObject" Param="someValue"/> | <REQUEST Method="methodName" On="SomeObject"><br>  <ARGUMENTS><br>    <CONSTANT Value="someValue"/><br>  </ARGUMENTS><br></REQUEST> |
| Calling a function on an object when a value is called for, and passing in multiple arguments | <FUNCTION Selector="methodName" Target="SomeObject"><br>  <!-- parameter expression goes here --><br>  <!-- parameter expression goes here --><br>  <!-- parameter expression goes here --><br></FUNCTION> | <REQUEST Method="methodName" On="SomeObject"><br>  <ARGUMENTS><br>    <!-- parameter expression goes here --><br>    <!-- parameter expression goes here --><br>    <!-- parameter expression goes here --><br>  </ARGUMENTS><br></REQUEST> |
| Calling a function on an object when a value is called for, and passing in a reference to another object | <FUNCTION Selector="methodName" Target="SomeObject" Param= "_SOMEOBJECTNAME"/> | <REQUEST Method="methodName" On="SomeObject"><br>  <ARGUMENTS><br>    <CONSTANT IDRef="SOMEOBJECTNAME"/><br>  </ARGUMENTS><br></REQUEST> |
| Calling a static function on a class when a value is called for | <FUNCTION Selector="staticMethodName" Target="some.package.SomeClass"/> | <REQUEST Method="staticMethodName" OnClass="some.package.SomeClass"/> |
| Calling a constructor on a class when a value is called for | <FUNCTION Selector="SomeClass" Target="some.package.SomeClass"/> | <REQUEST Method="new" OnClass="some.package.SomeClass"/> |
| Getting a bean property when a value is called for | <FUNCTION Selector="property" Target="SomeBean"/> | <GET Name="property" On="SomeBean"/> |
| Getting a field when a value is called for | <FUNCTION Selector="field" Target="SomeObject"/> | <GET Name="field" On="SomeObject"/> |
| Getting a static field, such as a constant, when a value is called for | <FUNCTION Selector="ACONSTANT" Target="some.package.SomeClass"/> | <GET Name="ACONSTANT" OnClass="some.package.SomeClass"/> |
| Calling a function on an object returned by another expression when a value is called for | <FUNCTION Selector="methodOnResultObject"><br>  <TARGET Selector="methodThatReturnsObject" Target="SomeObject"/><br></FUNCTION> | <REQUEST Method="methodOnResultObject"><br>  <ON><br>    <REQUEST Method="methodThatReturnsObject" On="SomeObject"/><br>  </ON><br></REQUEST> |
| Specifying a simple literal value when a value is called for | <PARAM Value="AValue"/> | <CONSTANT Value="AValue"/> |
| Specifying a simple reference to another object when a value is called for | <PARAM Value="_SomeObject"/> | <CONSTANT IDRef="SomeObject"/> |
| Calling a function on an object when an action is called for | (same as FUNCTION but with an ACTION tag) | (same as REQUEST but with a CALL tag) |
| Setting a bean property with a simple value when an action is called for | <ACTION Selector="property" Target="SomeBean" param="someValue"/> | <SET Name="property" Value="someValue" On="SomeBean"/> |
| Setting a bean property with an expression when an action is called | <ACTION Selector="property" | <SET Name="property" On="SomeBean"> |

TABLE 1-continued

| PURPOSE | In BML | In ADML |
| --- | --- | --- |
| for | Target="SomeBean"><br><!-- some expression<br>goes here --><br></ACTION> | <VALUE><br><!-- some expression<br>goes here --><br></VALUE><br></SET> |
| Setting a field value when an action is called for | <ACTION Selector="field"<br>Target="SomeObject"<br>param="someValue" /> | <SET Name="field" Value=<br>"someValue"<br>On="SomeObject"/> |

Text Constructs in ADML

Part of the ADML design is to allow text to be embedded within beans 212 and beans 212 within text and to allow both to interact with each other through ADML events. The text features center around three tags defined in the ADML DTD: TEXT, P, and STYLE.

The TEXT tag is a tag 314 from the <COMPONENT>, <CONTAINNER> <BEAN> family of components 212. It resembles them in most respects in that it can generate events, be laid out within its parent with POSITION constraints, etc. The ADML event types available for the TEXT component 212 are the names of all the methods of all the listeners capable of being registered with a JTextComponent. A TEXT tag should not be empty because it contains at least one paragraph.

A Paragraph is defined by the P tag 314. The paragraph can contain text, beans 212, and STYLE tags 314 that in turn contain more text and beans 212. It has certain bean 212 properties that correspond to paragraph attributes. In one embodiment, paragraphs do not have an INIT section, so these properties 320 should be set inside of the INIT section for the paragraph's type. Examples of text properties 320 are shown below in Table 2.

TABLE 2

| property name | values |
| --- | --- |
| alignment | LEFT<br>CENTER<br>RIGHT<br>JUSTIFIED |
| lineSpacing | float (points) |
| spaceAbove | float (points) |
| spaceBelow | float (points) |
| leftIndent | float (points) |
| rightIndent | float (points) |
| firstLineIndent | float (points) |

Additionally, any properties from STYLE are available to paragraphs. For example, to make a paragraph that contains red, centered text, with ½ inch left and right indents, a paragraph type is initially made that declares these properties as shown below:

```
<TYPE ID="CENTEREDRED" Type="P">
  <INIT>
    <SET Name="alignment" Value="CENTER"/>
    <SET Name="leftIndent" Value="36.0"/>
```

-continued

```
    <SET Name="rightIndent" Value="36.0"/>
  </INIT>
</TYPE>
```

Thereafter, the paragraph of that type is declared:

```
<P Type="CENTEREDRED">
  This is centered text!
</P>
```

Styles

A Style is defined by the STYLE tag. The paragraph can contain text and beans 212. It has certain bean properties 320 that correspond to text attributes 310. In one embodiment, since styles cannot have an INIT section, these properties should be set inside of the INIT section for the style's type. An exemplary list of the style properties 320 is provided below in Table 3.

TABLE 3

| property name | values |
| --- | --- |
| text | the text inside that style block. Can be used to change the text within that block dynamically. |
| font | a font string of the form accepted by Font.decode(). |
| fontFamily | string of the type returned by Font.getFamily(). |
| fontSize | int (points) |
| bold | true or false |
| italic | true or false |
| underline | true or false |
| foreground | a color string of the form #rrggbb |

For example, to make a style for large, green text, a style type that declares these properties 320 is shown below:

```
<TYPE ID="BIGGREEN" Type="Normal">
  <INIT>
    <SET Name="foreground" Value="&LeafGreen;"/>
    <SET Name="font" Value="TimesRoman-bold-72"/>
  </INIT>
</TYPE>
```

Thereafter, a style may be declared of that type:

```
<STYLE Type="BIGGREEN">
  This is big, green and ugly text!
</STYLE>
```

Hypertext Events

There are three special event types defined for styles related to hypertext. These event types include:

hyperlinkActivated—called when text within that style block is clicked, hyperlinkEntered—called when mouse enters that style block, and hyperlinkexited—called when mouse exits that style block.

Such event types can be used to create hypertext links. To create a hypertext link that is normally blue and underlined, but turns red when the mouse is over it, a style is first declared that is underlined and blue:

```
<TYPE ID="LINK" Type="Normal">
  <INIT>
    <SET Name="foreground" Value="#0000FF"/>
    <SET Name="underline" Value="true"/>
  </INIT>
</TYPE>
```

Thereafter, a text block is created with a style of that type, along with some EVENT tags:

```
<STYLE Type="LINK">
  <EVENT Type="hyperlinkActivated">
    <SET Name="text" Value="Hey, you clicked me!"/>
  </EVENT>
  <EVENT Type="hyperlinkEntered">
    <SET Name="foreground" Value="#FF0000"/>
  </EVENT>
  <EVENT Type="hyperlinkExited">
    <SET Name="foreground" Value="#0000FF"/>
  </EVENT>
  Click me!
</STYLE>
```

Although the foregoing provides a number of specific embodiments of an application description language (ADL), one skilled in the art will recognize that a variety of ADLs may be used within the scope of the present invention. Thus, the specific syntax of the ADL is not crucial and may vary without departing from the spirit of the invention.

Method of Operation

Referring now to FIG. 4A there is shown a high-level flow diagram for a method of creating and configuring a component-based application in accordance with a preferred embodiment of the present invention. The method begins by creating 402 the XML parse tree 204. Preferably, a conventional parser 116 is used to parse the ADF 202, as illustrated in FIG. 3A.

Thereafter, the method continues by transforming 404 the parse tree 204 into uninitialized components 212. This step will be described in greater detail below with reference to FIG. 4B. Nevertheless, as noted above, each element 306 in the parse tree 204 is mapped to a corresponding target class 132, after which an uninitialized component 212 is instantiated. In addition, each attribute 310 of the element 306 is mapped to a corresponding property 320 of the component 212 by the attribute mapper 124.

The method continues by processing 406 the components 212 to launch the component-based application 214. This step will be described in greater detail with respect to FIG. 4D. Nevertheless, in one embodiment, this is accomplished by initializing each of the components 212 and adding each child component 212 to its parent component 212.

Figure 4B:
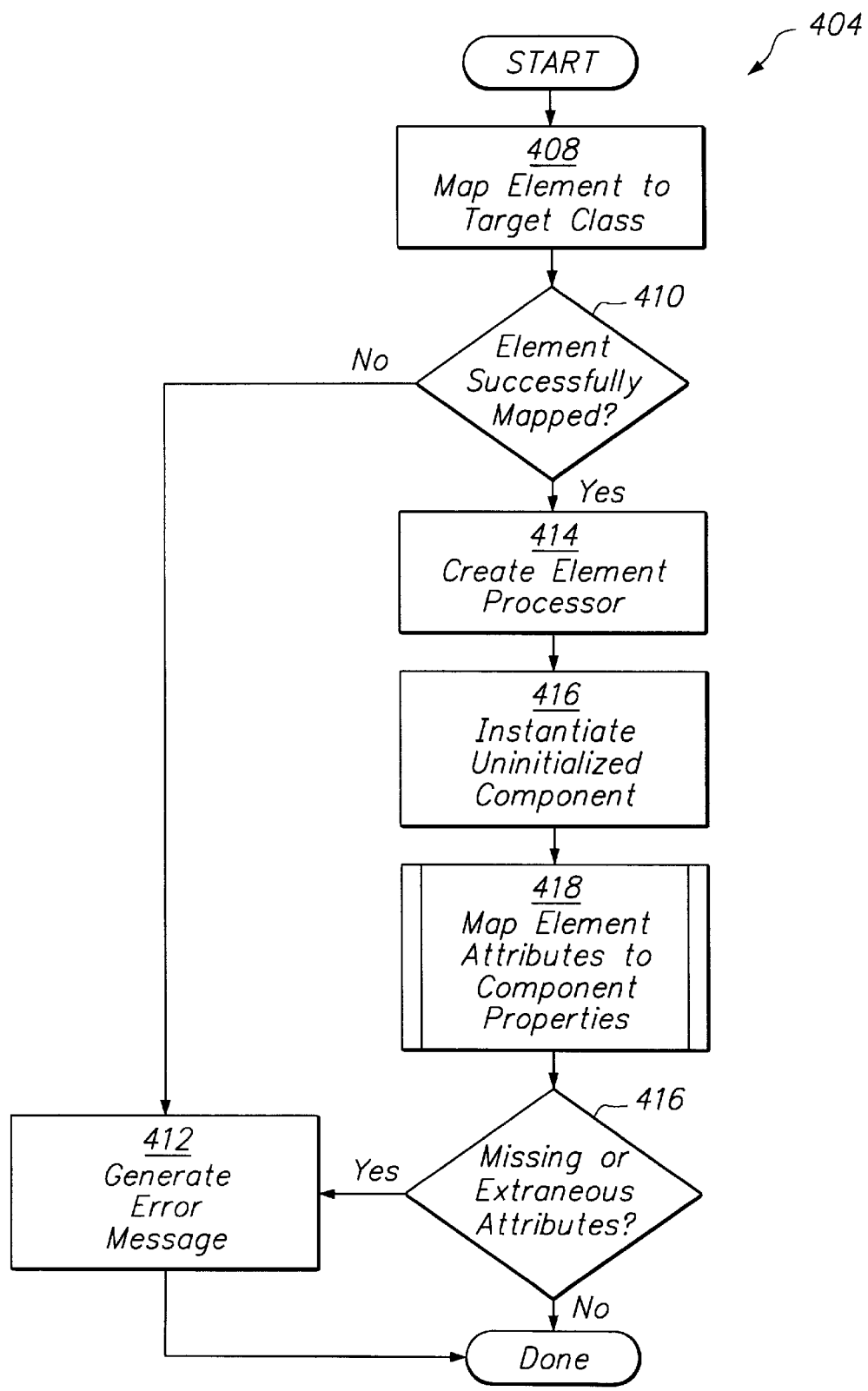
FIG. 4B is a flowchart for a method of transforming the elements of the parse tree into uninitialized components in accordance with a preferred embodiment of the present invention.

Referring now to FIG. 4B, there is shown a method of transforming the elements 204 of the parse tree 204 into uninitialized components 212 in accordance with a preferred embodiment of the present invention. As noted above, this is accomplished by recursively descending the parse tree 204 and creating an element processor 118 for each elements 306. Preferably, the parse tree 204 is traversed using a post-order recursive traversal algorithm, such that each child component 212 is created before its parent component 212. In one embodiment, the nodes of the parse tree 204 other than elements 306 are either ignored (in the case of comments 302 and processing instructions 304) or are processed appropriately (in the case of data 308).

Starting with the root element 306 of the parse tree 204, the method begins by mapping 408 the element 306 to a target class 132. Preferably, an element mapper 112 is provided, which is an object used to map the string tag 314 of an element 314 with the corresponding element processor 118 and Java component class 132. In one embodiment, the element mapper 122 is implemented by an ElementTagManagerIntf instance, the public interface of which is provided below in Java pseudo-code:

```
public interface ElementTagManagerIntf {
    // tells the manager to map theElementTag to the
    // processor with the class name, theProcessorClassName
    public void addProcessorTag(String theElementTag,
    String theProcessorClassName);
        // tells the manager to map theElementTag to the same
        // element processor as used by theDefaultElementTag but
        // to instantiate an instance of theJavaClassName instead
    public void addComponentClassTag(String theElementTag,
    String theDefaultElementTag,
    String theJavaClassName);
        // creates and returns the correct element processor
        // instance for the given element tag. Sets up this
        // processor to create a java instance of the correct
        // class
    public ElementProcessorIntf
    createComponentProcessorForTag(String theElementTag);
}
```

The mapping information is preferably provided to the ElementTagManagerIntf instance 122 at runtime through the call, addProcessorTag(String theElementTag,String theProcessorClassName). This call dynamically associates the given element string tag 314 with the specific element processor class 132 name. In one embodiment, a single global instance 122 of ElementTagManagerIntf is used. However, one skilled in the art will recognize that several such ElementTagManagerIntf instances 122 could be used, depending on the requirements of a particular application 214.

Following step 408, a determination 410 is made whether the element 306 was successfully mapped to a class 132. If not, an error message is generated 412, and the method is complete. Otherwise, the method continues by creating 414 the element processor 118 for the particular class 132. In one embodiment, the element processor 118 implements the Java interface, ElementProcessorIntf, an example of which provided below in Java pseudo-code:

```
public interface ElementProcessorIntf {
// instructs the given processor to handle the parse tree rooted at
// theElement and add the resulting component to
theContainerComponent
public void processElement(ElementIntf theElement,
    Object theContainerComponent,
    ElementTagManagerIntf theElementTagManager);
// instructs the given processor to construct an instance of the given
// java class and not its default class
public void setComponentClass(String theJavaClassName);
}
```

In one embodiment, a different element processor 118 is used for each distinct element tag 314. Alternatively, only a few "core" element processors 118 are used. In that case, instead of registering separate element processors 118 for every element tag 314, only the basic core element tags 314 have distinct element processors 118. Other element tags 314 simply reuse one of the core processors 118, but override the default component class 132 with their particular target class 132. In one embodiment, the target class 132 for a given element tag 314 can be specified in one of three ways:

1. Each element processor 118 has a "default" target class 132 associated with it. Unless otherwise overridden, an element tag 314 which makes use of this element processor 118 will create an instance of the given target class 132.
2. The target class 132 associated with a given element tag 314 may be "globally" overridden through the ElementTagManagerIntf method, addComponentClassTag(String theElementTag, String theDefaultElementTag, String theJavaClassName). This call specifies that the element processor 118 already registered with theDefaultElementTag should also be used with theElementTag but that instead of creating an instance of the default target class 132 for that processor 118, an instance is of theJavaClassName should be created instead.
3. In one embodiment, it is also possible to locally "override" a processor's target class 132 through a special markup attribute 310, Class. The value of the Class attribute 310 is expected to be the fully qualified name of a target class 132 which can be created and used by the given element processor 118 for a specific element 306 instance. In one embodiment built upon the Java programming language, the element processor 118 expects the value of the Class attribute 310 to be the fully qualified name of an accessible Java class 132 (what constitutes a valid, accessible Java class 132 will depend on the end-user's system and network environment as well as the other resources provided by the application 214). When the element processor 118 finds the Class attribute 310 declaration in a particular element 306 declaration, it is instructed to create and use the specified Java class 132 instead of the Java class 132 normally registered for that element 306. For example, in one embodiment, the following element 306 declaration instantiates an instance of the class 132, "my.SpecialClass", rather than the default class 132 specified for the given element processor 118:

<Foo Class=my.SpecialClass Att1=Value1Att2=Value2>

For the root element 306 of the parse tree 204, a top-level element processor 118 is preferably created. As explained in greater detail below, the top-level processor 118 is used to create a root component 212. In one embodiment, the root component 212 manages the "event loop" of application 214 and thus receives update and user event messages generated by the platform-specific operating system 128.

One skilled in the art will recognize that the above-mentioned process is only one embodiment of the present invention, other variations are possible and may be advantageous under certain circumstances. For example, instead of using intermediary element processors 118, a variation could create Java components 212 directly and expect each component 212 to implement its own "processing" logic.

After the element processor 118 is created, it instantiates 416 an uninitialized component 212, which is preferably a default instance of the associated Java class 132. Alternatively, the component 212 may be created in a non-default way, if so specified in special attributes 310 or child elements 306 dedicated to that purpose.

After the component 212 has been instantiated, the element processor 118 maps 418 each attribute 310 in the attribute list 312 to a corresponding property 320 in the component 212. In one embodiment, the element processor 118 uses an attribute mapper 124 for this purpose. A detailed explanation of this process is provided below.

Preferably, each element processor 118 is free to treat attribute 310 declarations in its own manner. A given element processor 118, for example, may choose to ignore certain attributes 310 or use specified attribute values in non-conventional ways. However, the default, "core" element processors 118 used in one embodiment of the invention treat the attribute lists 310 in a simple, canonical manner as defined hereafter.

The element processors 118 expect the target component 212 to provide an exact description of its publicly accessible methods and properties 320 such that string-based attribute keys can be mapped to executable "mutator" and "accessor" methods on the target component 212. In one embodiment, this information is obtained through an attribute mapper 124, such as the BeanInfo instance as defined by Sun's JavaBeans specifications. The BeanInfo object 124 is used to map attribute 310 names to corresponding properties 320 in the underlying component 212. If the present invention is implemented in a different object-oriented languages such as Smalltalk or C++, analogous metadata frameworks could be used.

Figure 5:
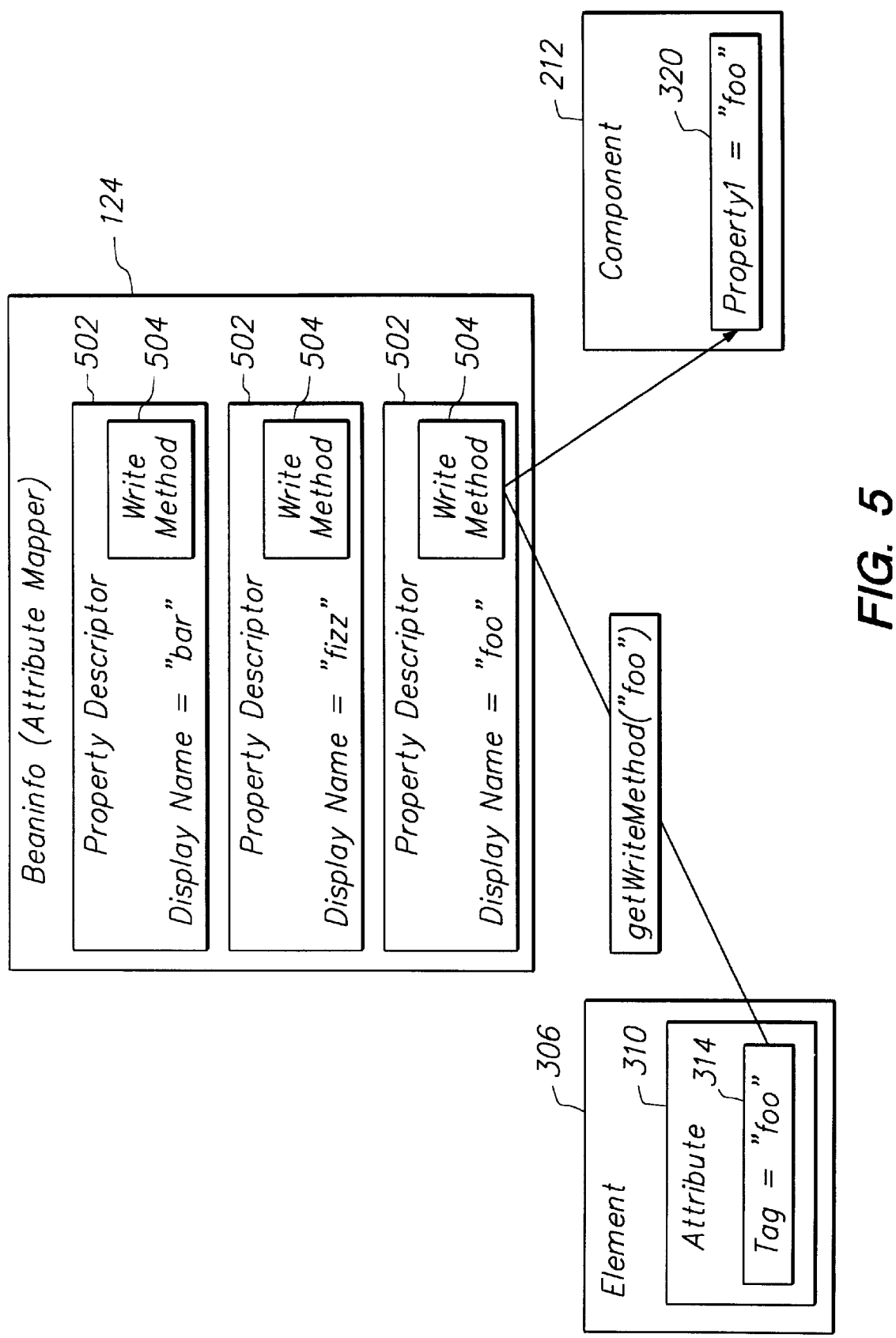
FIG. 5 is an illustration of an attribute mapper in accordance with a preferred embodiment of the present invention.

As defined by the JavaBeans specification, each BeanInfo instance 124 may describe all its publicly accessible properties through an array of PropertyDescriptor instances 502, which are illustrated in FIG. 5. Each PropertyDescriptor instance 502 supplies a method, getDisplayName( ), which returns the localized, display name for the given property 320, as well as a set of accessor and mutator methods (referred to herein as "write methods" 504) to be used in obtaining and setting the value of the property 320 in the component 212.

Figure 4C:
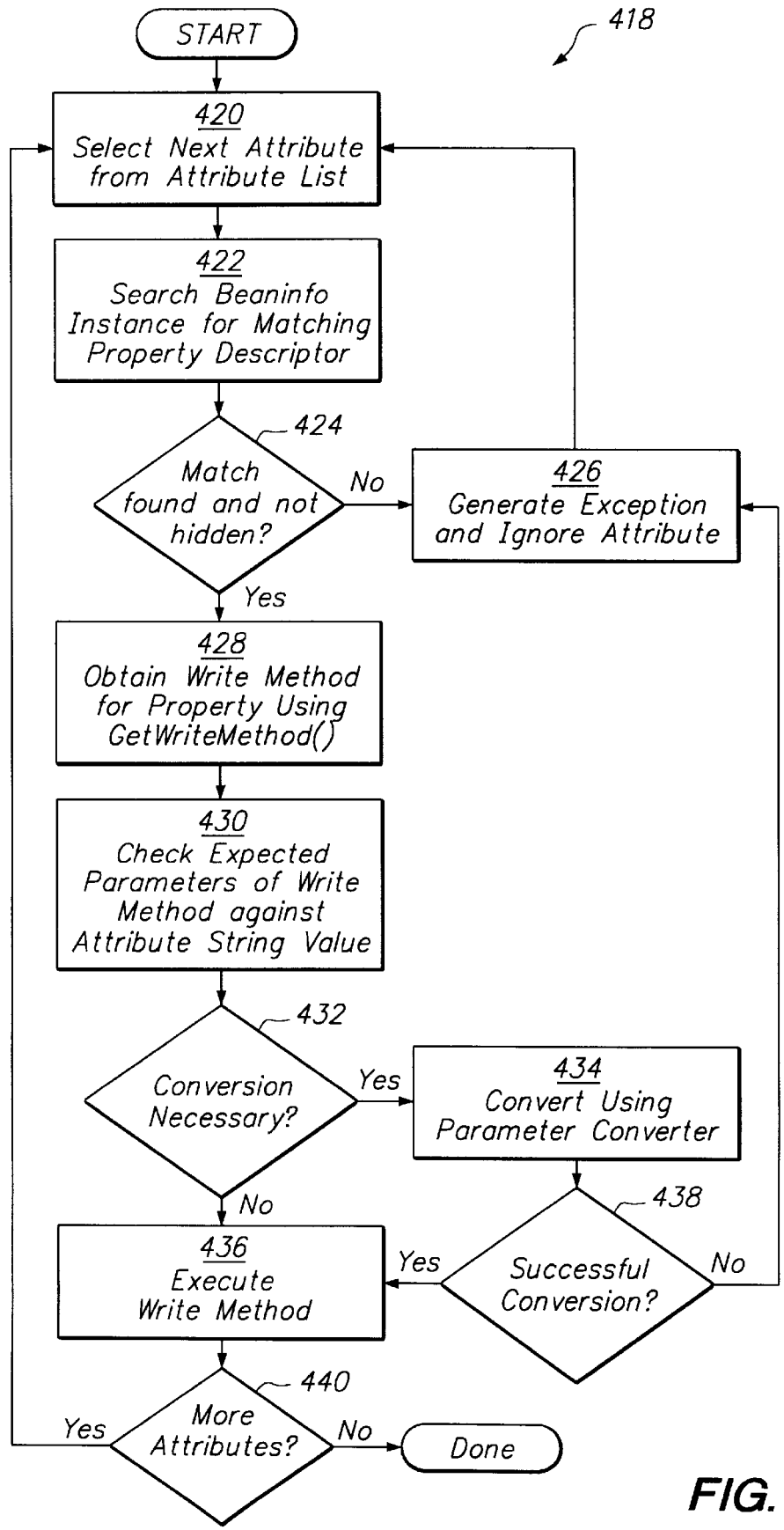
FIG. 4C is a flowchart for a method of mapping element attributes 310 to component properties 320 in accordance with a preferred embodiment of the present invention.

Referring now to FIG. 4C, there is shown a flow diagram for a method of mapping element attributes 310 to component properties 320. The method begins by selecting 420 the next attribute 310 in the attribute list 312. Thereafter, the element processor 118 searches 422 the given BeanInfo instance 124 for a PropertyDescriptor instance 502 whose display name matches the given attribute 310 name on a case-insensitive basis. A determination 424 is then made whether a match was found. If a match is found, the write method 504 of the property 320 is obtained 428 through a getWriteMethod( ) call, and the method continues at step 430. If a match is not found, or if the property is hidden (i.e. PropertyDescriptor's isHidden( ) message returns a "true" value), an exception is generated 426 and the attribute 310 is ignored.

If a valid write method 504 is obtained, the element processor 118 continues by checking 430 the expected parameters of the write method 504 against the string value of the attribute 310. A determination 432 then is made whether the attribute 230 value needs to be converted. If conversion is necessary, the method proceeds to step 434; otherwise, the method continues with step 436.

In one embodiment, the element processors 118 use a parameter converter 126 for converting string values into a variety of basic data types, such as integers, doubles, dates, booleans, and the like. Methods for such type conversions are well known to those skilled in the art. Additionally, the parameter converter 126 may convert string-based component references into the corresponding component 212 instances. For example, in one embodiment, a set of canonical object names may be used anywhere within a scoped name path. These canonical object names include:

_SELF which resolves to the current base target component 212;
_PARENT which resolves to the parent container of the current base target component 212;
_TOP which resolves to the top-level visual parent of the current base target component 212 (i.e. the visual container parent which itself has no visible parent);
_PREV which resolves to the previous child component 212 in the same parent container as the current base target component 212;
_NEXT which resolves to the next child component 212 in the same parent container as the current base target component 212;
_PAGE which resolves to the root component 212 corresponding to the root element 306 in which the caller is embedded;
_APP which resolves to the current application 214 instance.

A number of other naming conventions may be provided within the scope of the present invention.

If conversion is necessary, the attribute 320 string values are converted 434 by means of the parameter converter 126. A determination 438 is then made whether the conversion was successful. If so, the method proceeds to step 436; otherwise, control passes to step 426, wherein an exception is generated 426 and the attribute 310 is ignored.

After the attribute is converted, or if no conversion is necessary, the write method 504 is executed 436 with the attribute 310 value being passed as a parameter. Thereafter, a determination 440 is made whether more attributes 310 in the element 306 remain to be mapped to the component 212. If more attributes 310 remain, the method returns to step 420 to select the next attribute; otherwise, the method is complete.

As will be apparent from the foregoing discussion, for each attribute 310 in a given element 306, the element processor 118 set the properties 320 of the target component 212. An example of this process in Java pseudo-code is provided below:

```
public void handleAttributes(ElementIntf theElement,
    Object theComponent) {
BeanInfo aBeanInfo = getBeanInfo(theComponent);
For each attribute in element {
    // find property, if any, that matches attribute name
    PropertyDescriptor aProperty =getProperty(anAttributeName,
    aBeanInfo);
        // if writable, set component attribute
    if (aProperty.hasWriteMethod()) {
        setProperty(theComponent, aProperty, anAttributeValue);
    }
}
}
```

The setProperty( ) pseudo-method identified above takes a component object 212, a property 320, and a value, and attempts to call the property's write method 504, converting the value(s) to the correct data type(s), as follows:

```
protected void setProperty(Object theComponent,
    PropertyDescriptor theProperty,
    Object theValue) {
    // get write method itself
Method aWriteMethod = theProperty.getWriteMethod();
    // get parameter types
Class[] aTypes = aWriteMethod.getParameterTypes();
    // convert string value to correct class object
Object[] aParameters = convertParameters (theValue, aTypes);
    // invoke method
aWriteMethod(theComponent, aParameters);
}
```

In one embodiment, execution of the method is performed using the standard reflection functionality built into Java as of version 1.1 as specified by Sun Microsystems. Preferably, the element processors 118 expect all information about the underlying component 212 to be provided explicitly by the BeanInfo instance 124. Alternatively, runtime introspection could be used. One skilled in the art will recognize, however, that a variety of other element mappers 124 may be used within the scope of the present invention, and a Beaninfo instance 124 may be optional or unnecessary.

Referring again to FIG. 4B, after all of the attributes 310 in the attribute list 312 are mapped, a determination 416 is made whether an exception was signaled as a result of extraneous attributes 310, or whether any required attributes 310 were missing from the element 306. If either case is true, an error message is generated 412 and the method is complete.

Figure 4D:
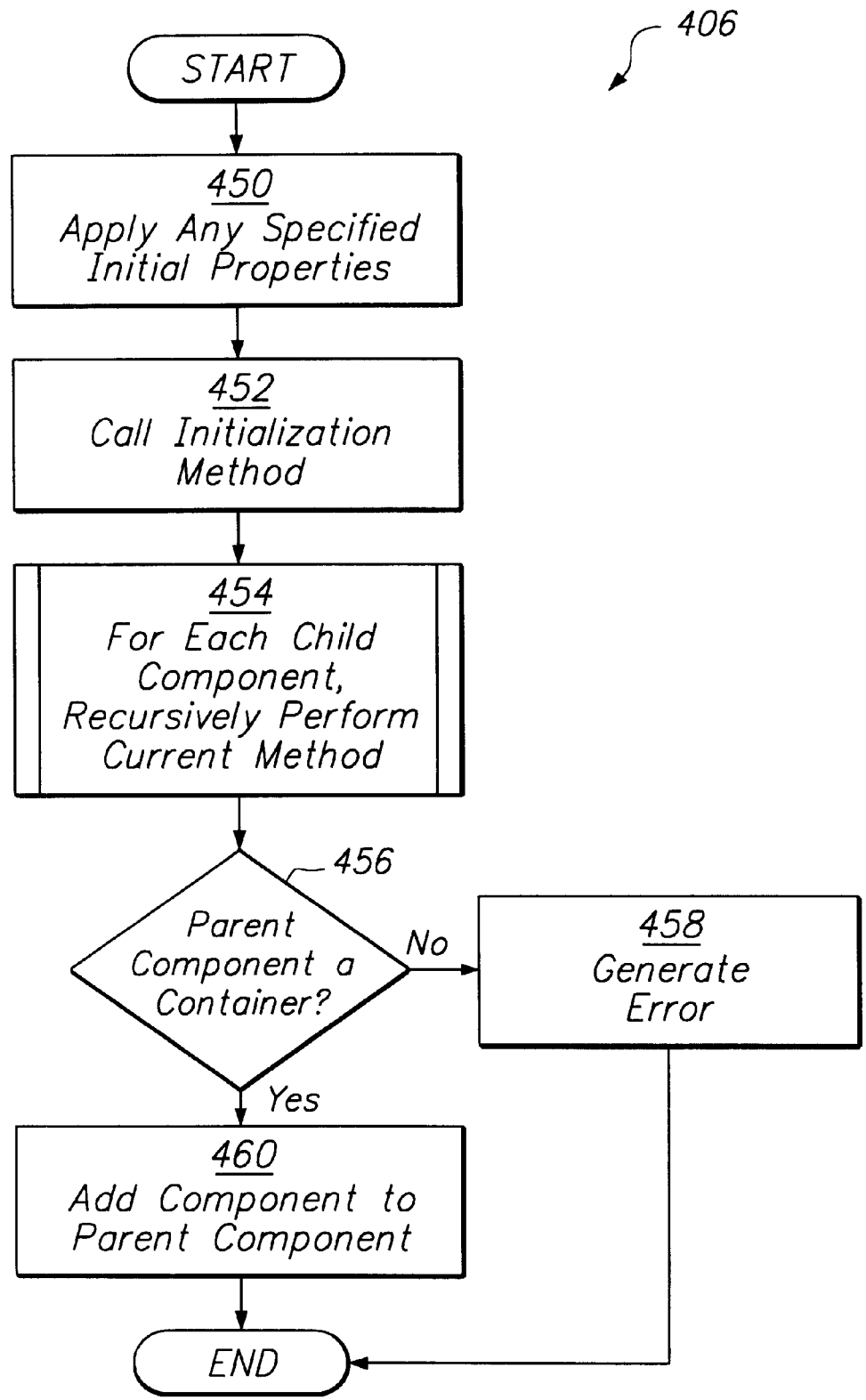
FIG. 4D is a flowchart for a method of processing the components to launch the component-based application 214 in accordance with a preferred embodiment of the present invention.

Referring now to FIG. 4D, there is shown a method of processing 406 the components 212 to launch the component-based application 214 in accordance with a preferred embodiment of the present invention. Preferably, an object graph 318 including a plurality of components 212 was created in step 404. Starting with the root component 212, the associated element processor 118 is invoked, which applies 450 any specified initial properties 320 to the component 212. In one embodiment, such properties 320 may be specified in an <INIT> section of the corresponding element 306.

Thereafter, the element processor 118 calls 452 any initialization method for the current component 212. In one embodiment, the initialization method may be specified in an <INIT> section of the corresponding element 306. Alternatively, a default method, such as init( ), may be used, as in the standard Java Applet class.

After the component 212 is initialized, the method continues by invoking the element processors 118 associated with any child elements, and instructing the element processors 118 to recursively perform each of the steps 450–460 of the current method. Because the initialization step 452 is performed using pre-order recursion, parent components 212 are initialized before their child components 212.

When a component 212 without children (a leaf component 212) is encountered, the method continues by determining 456 whether the parent component 212 is of the appropriate type to have child components 212 (i.e., it is a "container element"). This will depend on the underlying specification of the component 212 within the framework 130. If the component cannot have children, an error is generated 458. If, however, the component is a container element, the method continues by adding 460 the child component 212 to the parent component 212. After either step 460 or 458, control is returned to the parent element processor 118. When complete, all child components 212 are added to their parents 212, from the bottom of the object graph 318, upwards.

In one embodiment of the invention, after all of the components 212 have been processed, the init( ) and start( ) methods of the root component 212 are invoked in order to begin actual execution of the application 214. Preferably, the root component 212 implements the interface, MinAppIntf which is the minimal interface that is expected for any root-level component 212 to implement in order to be correctly instantiated and launched. In one embodiment, the MinAppIntf's interface is patterned after Java's standard Applet class. An example of the interface is provided below in Java pseudo-code:

```
public interface MinAppIntf {
    // sets this application's top-level main window instance
    public void setWindow(MainWindowIntf theWindow);
    // gives application chance to setup any initial state
    public void init();
    // tells application to start execution. This method should not
    // block. Event loop will be controlled externally by main window
    public void start();
```

The MinAppIntf also specifies a setWindow (MainWindowIntf theWindow) method which is used to set the underlying window instance. In one embodiment, each application has one and only one top-level main window. The top-level main window may be platform-specific (i.e. Windows 95, Macintosh, etc.). It manages the application's "event loop" and thus receives update and user event messages generated by the platform-specific operating system. A given application may have an unlimited number of "child" windows.

The application's main window is set prior to the init( ) sequence described above. The application's main window is responsible for communicating user and "paint" events to the application through its handleEvent(Event e) call. Finally, the window should be capable of supplying a graphics context on which the application's visible surface may be painted. The root component 212 class uses the start( ) method within the current processor 104 thread to launch the application 214 itself. After the start( ) call is made and finishes, the control passes to the created application 214.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the present invention.

Appendix A

The following document type definition (DTD) is a formal description of the syntax of a preferred application description language (ADL) called ADML.

```
<!-- ADML Document Type -->
<!-- Copyright Corel, 1998 -->

<!-- Standard character entities (defined here for SGML compatibility) -->

<!ENTITY lt    "&#60;">
<!ENTITY gt    ">">
<!ENTITY amp   "&#38;">
<!ENTITY apos  "'">
<!ENTITY quot  """>

<!--
  Model any elements which compute a value
-->
<!ENTITY % compute "GET | FIND | REQUEST | CONSTANT | ARRAY | ANY | ALL | NOT">

<!--
  Model of multiple elements which perform actions
-->
<!ENTITY % actions "(IF | CALL | SET)*">

<!--
  Model of setup
-->
<!ENTITY % setup "VALUE?, PARAMS?, INIT?">

<!--
  Model of customization and ordered abstract event specifiers
-->
<!ENTITY % custom "%setup;,START?, STOP?, EVENT*">

<!--
  Model of multiple normal embeddable components
-->
<!ENTITY % components "BEAN | COMPONENT | CONTAINER | TEXT">

<!--
  Model of single typed tag
-->
<!ENTITY % typed "(BODY | CONTAINER | COMPONENT | BEAN | LAYOUT | POSITION | TEXT | P | STYLE)">

<!--
  Attributes of a text style
```

```
-->
<!ENTITY % styleattr "ID ID #IMPLIED Type IDREF #IMPLIED">

<!--
   Attributes of layout objects
-->
<!ENTITY % layattr "Type IDREF #IMPLIED Value CDATA #IMPLIED">

<!--
   Attributes of a bean
-->
<!ENTITY % beanattr "%styleattr; Value CDATA #IMPLIED">

<!-- **********************************************************************
   ADML encloses a ADML document Child Tags:
      HEAD must contain any declarations
      BODY must contain any objects
-->

<!ELEMENT ADML (HEAD,BODY)>

<!-- **********************************************************************
   A header may contain type, listener, conversion, and bean info declarations
   TYPE provides information used to create objects
   LISTENER registers new event types with the runtime
   CONVERSION registers new automatic type conversions with the runtime
   BEANINFO provides extra information about bean classes at run-time
-->

<!ELEMENT HEAD (TYPE | LISTENER | CONVERSION | BEANINFO)*>

<!-- **********************************************************************
   TYPE declarations allow objects to be instantiated more abstractly:

Attributes:
      ID is later referred to in the Type fields of objects or TYPEs, and if
         identical to the Tag attribute specifies the default for the tag. It must not
         be the same as any other ID in the ADML document.
      Type may specify the ID of another type this Type inherits from, which must have
         been declared previously
      Tag may specify the tag which may be of this type, or if unspecified results in a
         non-constructable type unless the inherited type is constructable
      Class may specify the class that all objects of this type must be an instance of, or
         if unspecified, results in a non-constructable type
      Value may cause this type to be constructed by converting the specified string (mutually exclusive
         with the VALUE tag)
      Processor may specify the class responsible for processing the attributes and using
         them to initialize the object of this type, or if unspecified, the processor of the base type or
``` the default processor is used

Child Tags:
   VALUE may specify some alternate method of constructing objects of this type (mutually exclusive with
     the Value attribute)
   PARAMS may specify special parameters used by the secondary processor
   INIT may specify initialization of objects of this type, which is concatenated with the INIT of derived types
   START may specify how to start objects of this type, which is concatenated with the START of derived types
   STOP may specify how to start objects of this type, which is concatenated with the STOP of derived types
   EVENT may specify how to handle the events of objects of this type, which is concatenated with the
     corresponding EVENT of derived types
-->

```
<!ELEMENT TYPE (%custom;)>
<!ATTLIST TYPE  ID ID #REQUIRED
        Type IDREF #IMPLIED
        Tag %typed; #IMPLIED
        Class CDATA #IMPLIED
        Value CDATA #IMPLIED
        Processor CDATA #IMPLIED>
```

<!-- ******************************************************************
  BEANINFO declarations provides extra information about bean classes at run-time Attributes:
    Class must specify the class that this information applies to
    DefaultGetter may specify the name of a method which requires no arguments and
      can get the default value of the object
    DefaultSetter may specify the name of a method which requires a single argument and
      can set the default value of the object
    ClassReflectorFactory may specify a class implementing the ClassReflectorFactory interface that will
      be used to do custom reflection for objects of the class declared in the Class attribute.
-->

```
<!ELEMENT BEANINFO  EMPTY>
<!ATTLIST BEANINFO  Class CDATA #REQUIRED
        DefaultGetter CDATA #IMPLIED
        DefaultSetter CDATA #IMPLIED
        ClassReflectorFactory CDATA #IMPLIED>
```

<!-- ******************************************************************
  LISTENER declarations allow additional listener types to be supplied Attributes:
    Adapter must specify the name of the additional listener adapter class supplied
-->

```
<!ELEMENT LISTENER  EMPTY>
<!ATTLIST LISTENER  Adapter CDATA #REQUIRED>
```

```
<!-- ******************************************************************
    CONVERSION declarations allow additional conversion types to be supplied automatically Attributes:
        OnClass must specify the name of the class providing the conversion (which is the name
            of the class being converted to if the method is "new"
        Method must specify the name of the static method to be invoked or "new" to construct a
            new object of that type
        FromClass may specify the name of the class type being converted from
-->

<!ELEMENT CONVERSION EMPTY>
<!ATTLIST CONVERSION OnClass CDATA #REQUIRED
            Method NMTOKEN #REQUIRED
            FromClass CDATA #IMPLIED>

<!-- ******************************************************************
    BEAN creates, initializes, and handles events of an invisible bean in a CONTAINER or BODY Attributes:
        ID may specify the name, if any, by which the bean becomes known, which must not be the same as any
            other ID
        Value may cause this bean to be constructed by converting the specified string (mutually exclusive
            with the VALUE tag)
        Type overrides the default type with a specific type of bean Child Tags:
        VALUE may specify some alternate method of constructing this bean (mutually exclusive with the
            Value attribute)
        PARAMS may specify special parameters used by the secondary processor
        INIT may specify initialization of the bean, which is concatenated with the INIT of the type
        START may specify how to start this bean
        STOP may specify how to start this bean
        EVENT may specify how to handle the events of a particular type
-->

<!ELEMENT BEAN    (%custom;)>
<!ATTLIST BEAN    %beanattr;>

<!-- ******************************************************************
    COMPONENT creates, initializes, positions, and handles events of a visible component in a CONTAINER or
BODY Attributes:
        ID may specify the name, if any, by which the component becomes known, which must not be the same as any
            other ID
        Value may cause this component to be constructed by converting the specified string (mutually exclusive
            with the VALUE tag)
        Type overrides the default type with a specific type of component Child Tags:
        POSITION may specify the position of this component within the containing CONTAINER or BODY
```

VALUE may specify some alternate method of constructing this component (mutually exclusive with the Value attribute)
PARAMS may specify special parameters used by the secondary processor
INIT may specify initialization of the component, which is concatenated with the INIT of the type
START may specify how to start this component
STOP may specify how to start this component
EVENT may specify how to handle the events of a particular type
-->

<!ELEMENT COMPONENT (POSITION?, %custom;)>
<!ATTLIST COMPONENT %beanattr;>

<!-- ******************************************************************
CONTAINER creates, initializes, positions, and handles events of a visible container and its children in a CONTAINER or BODY Attributes:
    ID may specify the name, if any, by which the container becomes known, which must not be the same as any other ID
    Value may cause this container to be constructed by converting the specified string (mutually exclusive with the VALUE tag)
    Type overrides the default type with a specific type of container Child Tags:
    POSITION may specify the position of this container within the containing CONTAINER or BODY
    LAYOUT may specify the layout manager of the container
    VALUE may specify some alternate method of constructing this container (mutually exclusive with the Value attribute)
    PARAMS may specify special parameters used by the secondary processor
    INIT may specify initialization of the container, which is concatenated with the INIT of the type
    START may specify how to start this container
    STOP may specify how to start this container
    EVENT may specify how to handle the events of a particular type
    BEAN, COMPONENT, CONTAINER, and TEXT may embed these types of objects in the container
-->

<!ELEMENT CONTAINER (POSITION?, LAYOUT?, %custom;, (%components;)*)>
<!ATTLIST CONTAINER %beanattr;>

<!-- ******************************************************************
BODY creates, initializes, positions, and handles events of a root ADML container and its children Attributes:
    ID may specify the name, if any, by which the body becomes known, which must not be the same as any other ID
    Value may cause this body to be constructed by converting the specified string (mutually exclusive with the VALUE tag)
    Type overrides the default type with a specific type of body Child Tags:
    LAYOUT may specify the layout manager of the body container
    VALUE may specify some alternate method of constructing this container (mutually exclusive with the Value attribute)
    PARAMS may specify special parameters used by the secondary processor
    INIT may specify initialization of the body container, which is concatenated with the INIT of the type
    START may specify how to start this body container
    STOP may specify how to start this body container
    EVENT may specify how to handle the events of a particular type
    BEAN, COMPONENT, CONTAINER, and TEXT may embed these types of objects in the body container
-->

<!ELEMENT BODY (LAYOUT?, %custom;, (%components;)*)>
<!ATTLIST BODY %beanattr;>

<!-- ****************************************************************
    TEXT creates, initializes, positions, and handles events of a visible text component and its paragraphs
    in a CONTAINER or BODY Attributes:
        ID may specify the name, if any, by which the text becomes known, which must not be the same as any
            other ID
        Value may cause this text component to be constructed by converting the specified string (mutually exclusive
            with the VALUE tag)
        Type overrides the default type with a specific type of text Child Tags:
        POSITION may specify the position of this text component within the containing CONTAINER or BODY
        VALUE may specify some alternate method of constructing this text component (mutually exclusive with the
            Value attribute)
        PARAMS may specify special parameters used by the secondary processor
        INIT may specify initialization of the text component, which is concatenated with the INIT of the type
        START may specify how to start this text component
        STOP may specify how to start this text component
        EVENT may specify how to handle the events of a particular type
        P may embed paragraphs in the text
-->

<!ELEMENT TEXT (POSITION?, %custom;, P+)>
<!ATTLIST TEXT %beanattr;>

<!-- ****************************************************************
    P creates, initializes, positions, and handles events of a visible paragraph component and its styles
    and content in a TEXT Attributes:
        ID may specify the name, if any, by which the paragraph becomes known, which must not be the same as any
            other ID
        Type overrides the default type with a specific type of paragraph Child Tags:
        #PCDATA content may embed paragraph text
        STYLE may embed styles with text in the paragraph
        EVENT may specify how to handle the events of a particular type
-->

59

```
<!ELEMENT P    (#PCDATA | STYLE | EVENT | %components;)*>
<!ATTLIST P    %styleattr;>

<!-- *********************************************************************
    STYLE creates, initializes, positions, and handles events of a visible text style and its styles
        and content in a TEXT Attributes:
        ID may specify the name, if any, by which the style becomes known, which must not be the same as any
            other ID
        Type overrides the default type with a specific type of style Child Tags:
        #PCDATA may embed text in the style
        EVENT may specify how to handle the events of a particular type
-->

<!ELEMENT STYLE (#PCDATA | EVENT | %components;)*>
<!ATTLIST STYLE %styleattr;>

<!-- *********************************************************************
    POSITION creates, initializes, and handles events of a position constraint and uses it to position a COMPONENT,
        CONTAINER, or TEXT within a CONTAINER or BODY Attributes:
        Value may cause this position to be constructed by converting the specified string (mutually exclusive
            with the VALUE tag)
        Type overrides the default type with a specific type of position Child Tags:
        VALUE may specify some alternate method of constructing this position (mutually exclusive with the
            Value attribute)
        PARAMS may specify special parameters used by the secondary processor
        INIT may specify initialization of the position, which is concatenated
            with the INIT of the position type
-->

<!ELEMENT POSITION (%setup;)>
<!ATTLIST POSITION %layattr;>

<!-- *********************************************************************
    LAYOUT creates, initializes, and handles events of a position layout and uses it to position a COMPONENT,
        CONTAINER, or TEXT within a CONTAINER or BODY Attributes:
        Value may cause this layout to be constructed by converting the specified string (mutually exclusive
            with the VALUE tag)
        Type overrides the default type with a specific type of layout Child Tags:
```

VALUE may specify some alternate method of constructing this layout (mutually exclusive with the
   Value attribute)
PARAMS may specify special parameters used by the secondary processor
INIT may specify initialization of the layout, which is concatenated
   with the INIT of the layout type
-->

<!ELEMENT LAYOUT    (%setup;)>
<!ATTLIST LAYOUT    %layattr;>

<!-- *********************************************************************
   INIT specifies the initialization of a BODY, CONTAINER, COMPONENT, BEAN, LAYOUT, POSITION,
TEXT, DOCUMENT, P, STYLE,
      or TYPE Child Tags:
      IF tag may conditionally execute initialization based upon the value of properties
         or requests
      CALL tag may call methods on this or other objects
      SET tag may set the values of properties or public fields on this or other objects
-->

<!ELEMENT INIT %actions;>

<!-- *********************************************************************
   START specifies the startup of a BODY, CONTAINER, COMPONENT, BEAN, LAYOUT, POSITION, TEXT,
DOCUMENT, P, STYLE,
      or TYPE, specifying the action to take when the body becomes visible Child Tags:
      IF tag may conditionally execute startup based upon the value of properties
         or requests
      CALL tag may call methods on this or other objects
      SET tag may set the values of properties or public fields on this or other objects
-->

<!ELEMENT START%actions;>

<!-- *********************************************************************
   STOP specifies the stopping of a BODY, CONTAINER, COMPONENT, BEAN, LAYOUT, POSITION, TEXT,
DOCUMENT, P, STYLE,
      or TYPE, specifying the action to take when the body becomes invisible Child Tags:
      IF tag may conditionally execute stopping based upon the value of properties
         or requests
      CALL tag may call methods on this or other objects
      SET tag may set the values of properties or public fields on this or other objects
-->

<!ELEMENT STOP  %actions;>

```
<!-- ******************************************************************
    EVENT specifies the event handling of a BODY, CONTAINER, COMPONENT, BEAN, LAYOUT, POSITION,
TEXT, DOCUMENT, P, STYLE.
    or TYPE, specifying the action to take when an event of a specified type occurs Attributes:
        Type must specify the type of event to handle Child Tags:
        IF tag may conditionally execute event handling based upon the value of properties
            or requests
        CALL tag may call methods on this or other objects
        SET tag may set the values of properties or public fields on this or other objects
-->

<!ELEMENT EVENT   %actions;>
<!ATTLIST EVENT  Type CDATA #REQUIRED>

<!-- ******************************************************************
    IF conditionally executes nested property SETs, CALLs, IFs, ELSEIFs, ELSE, and so on according to the
evaluation of a
        condition Child Tags:
        GET, FIND, REQUEST, CONSTANT, ARRAY, ANY, ALL or NOT obtains a boolean value to determine
            whether the action or the ELSEIF or ELSE should be executed
        IF, CALL, and SET may specify actions to take if the boolean was true
        ELSEIF may specify additional conditions with actions to check if the boolean was false
        ELSE tag may specify action to take if the boolean and any ELSEIFs were false
-->

<!ELEMENT IF     ((%compute;), %actions;, ELSEIF*, ELSE?)>

<!-- ******************************************************************
    ELSEIF specifies additional checks if the main actions of a conditional are not taken Child Tags:
        GET, FIND, REQUEST, CONSTANT, ARRAY, ANY, ALL or NOT must obtain a boolean value to determine
            whether the action
            or following ELSEIFs or ELSE should be executed
        IF, CALL, and SET may specify actions to take if the boolean was true
-->

<!ELEMENT ELSEIF   ((%compute;), %actions;)>

<!-- ******************************************************************
    ELSE specifies alternative actions to execute if the containing IF boolean evaluated false Child Tags:
```

IF, CALL, and SET may specify the actions to take if the IF boolean was false
-->

<!ELEMENT ELSE    %actions;>

<!-- *********************************************************************
    ANY allows multiple boolean returns to be evaluated true if any was true Child Tags:
        GET, FIND, REQUEST, CONSTANT, ARRAY, ANY, ALL and NOT may be sequentially evaluated for any
true
-->

<!ELEMENT ANY (%compute;)+>

<!-- *********************************************************************
    ALL allows multiple boolean returns to be evaluated true if all were true Child Tags:
        GET, FIND, REQUEST, CONSTANT, ARRAY, ANY, ALL and NOT may be sequentially evaluated for all
true
-->

<!ELEMENT ALL (%compute;)+>

<!-- *********************************************************************
    NOT allows a boolean request to be evaluated false if it was true and true if it was false Child Tags:
        GET, FIND, REQUEST, CONSTANT, ARRAY, ANY, ALL or NOT must provide the true or false value
            to be inverted
-->

<!ELEMENT NOT (%compute;)>

<!-- *********************************************************************
    CALL calls a method on an object passing any specified arguments Attributes:
        On may specify the ID of an object on which a static or instance method is to be called (mutually
            exclusive with the ON tag)
        OnClass may specify the name of a class on which a method is to be called, and defaults to the class of the
            object containing the call or the object specified as the On Attribute or ON tag
        Method must specify the name of the method to be called Child Tags:
        ON may specify the object on which the method should be invoked (mutually exclusive with the On attribute)
-->

<!ELEMENT CALL (ON?, ARGUMENTS?)>

```
<!ATTLIST CALL On CDATA #IMPLIED
         OnClass CDATA #IMPLIED
         Method NMTOKEN #REQUIRED>
```

<!-- ******************************************************************

REQUEST calls a method on an object which returns a value passing any specified arguments and indexing and converting the return as specified Attributes:
   On may specify the ID of an object on which a static or instance method is to be called (mutually exclusive with the ON tag)
   OnClass may specify the name of a class on which a method is to be invoked, and defaults to the class of the object containing the call or the object specified as the On Attribute or ON tag
   Method must specify the name of the method to be invoked or "new" to construct an object of the class
   Index may specify the index of the item in the returned array to be returned (mutually exclusive with the INDEX tag)
   As may specify the name of a type which the returned object must be converted to Child Tags:
   ON may specify the object on which the method should be invoked, which overrides the On and OnClass attributes
   ARGUMENTS may specify the arguments to be passed to the method
   INDEX may specify a dynamic value to index a requested array (mutually exclusive with the Index attribute)
-->

```
<!ELEMENT REQUEST (ON?, ARGUMENTS?, INDEX?)>
<!ATTLIST REQUEST On CDATA #IMPLIED
         OnClass CDATA #IMPLIED
         Method NMTOKEN #REQUIRED
         Index CDATA #IMPLIED
         As CDATA #IMPLIED>
```

<!-- ******************************************************************
SET sets a property or a public field on an object Attributes:
   On may specify the ID of an object on which a static or instance field or property is to be set (mutually exclusive with the ON tag)
   OnClass may specify the name of a class on which a public field or property is to be set, and defaults to the class of the object containing the set or the object specified as the On Attribute or ON tag
   Name may specify the name of the property or public field to be set, or if not specified, will use the default setter
   Method may specify the name of the setter for the named property if not directly derivable
   Value may specify the value which the public field or property should be set to (mutually exclusive with the VALUE tag)
   Index may specify the index of the item in an array to be set (mutually exclusive with the INDEX tag)

Child Tags:
   ON may specify the object on which the static or instance field or property should be set (mutually exclusive with the On attribute)
   VALUE may specify the value which the property or field is to be set to (mutually exclusive with the Value attribute)

INDEX may specify a dynamic value to index the item in the array to set (mutually exclusive with the Index
            attribute)
    -->

<!ELEMENT SET  (ON?, VALUE?, INDEX?)>
<!ATTLIST SET On CDATA #IMPLIED
        OnClass CDATA #IMPLIED
        Name NMTOKEN #IMPLIED
        Method NMTOKEN #IMPLIED
        Value CDATA #IMPLIED
        Index CDATA #IMPLIED>

<!-- *******************************************************************
    GET sets a property or a public field on an object Attributes:
        On may specify the ID of an object on which a static or instance field or property is to be gotten (mutually
            exclusive with the ON tag)
        OnClass may specify the name of a class on which a public field or property is to be gotten, and defaults to
            the class of the object containing the get or the object specified as the On Attribute or ON tag
        Name may specify the name of the property or public field to be gotten, or if not specified, will
            use the default getter
        Method may specify the name of the getter for the named property if not directly derivable
        Index may specify the index of the item in the gotten array to be returned (mutually exclusive with the
            INDEX tag)
        As may specify the name of a type which the gotten value will be converted to Child Tags:
        ON may specify the object on which the static or instance field or property should be gotten (mutually
            exclusive with the On attribute)
        INDEX may specify a dynamic value to index a gotten array (mutually exclusive with the Index attribute)
    -->

<!ELEMENT GET (ON?, INDEX?)>
<!ATTLIST GET On CDATA #IMPLIED
        OnClass CDATA #IMPLIED
        Name NMTOKEN #IMPLIED
        Method NMTOKEN #IMPLIED
        Index CDATA #IMPLIED
        As CDATA #IMPLIED>

<!-- *******************************************************************
    ON targets a CALL, REQUEST, SET, or GET tag dynamically to an object Child Tags:
        GET, FIND, REQUEST, CONSTANT, ARRAY, ANY, ALL or NOT tag must be inserted to specify
            the targeted object
    -->

<!ELEMENT ON  (%compute;)>

```
<!-- ********************************************************************
    FIND gets an object by its ID attribute Attributes:
        ID may specify the ID of the object in to be found (mutually exclusive with any child tag)
        As may specify the name of a type to which the object must be converted Child Tags:
        GET, FIND, REQUEST, CONSTANT, ARRAY, ANY, ALL or NOT may supply the ID of the object to be
        found (mutually exclusive with the ID attribute)
-->

<!ELEMENT FIND (%compute;)?>
<!ATTLIST FIND  ID CDATA #IMPLIED
        As CDATA #IMPLIED>

<!-- ********************************************************************
    CONSTANT constructs a simple unnamed object of any type which supports a conversion from a string Attributes:
        Value may specify the string value which the value is converted from (mutually exclusive with
            IDRef attribute)
        IDRef may specify a statically-bound reference to an object (mutually exclusive with Value
            attribute)
        As may specify the name of a type to which the value must be converted
-->

<!ELEMENT CONSTANT  EMPTY>
<!ATTLIST CONSTANT Value CDATA #IMPLIED
        IDRef CDATA #IMPLIED
        As CDATA #IMPLIED>

<!-- ********************************************************************
    INDEX gets a dynamic value to index a gotten or requested array from an embedded value Child Tags:
        GET, FIND, REQUEST, CONSTANT, ARRAY, ANY, ALL or NOT tag must be inserted to obtain the index
        to be used to index the value
-->

<!ELEMENT INDEX(%compute;)>

<!-- ********************************************************************
    ARRAY constructs an array object in a container or body Attributes:
        As may specify the name of a type which the array should require of all elements Child Tags:
        GET, FIND, REQUEST, CONSTANT, ARRAY, ANY, ALL, or NOT provide the array elements
-->
```

```
<!ELEMENT ARRAY (%compute;)*>
<!ATTLIST ARRAY As CDATA #IMPLIED>

<!-- ******************************************************************
    ARGUMENTS specifies the arguments to be passed to a CALL or REQUEST Attributes:
        Classes may be specified as a list of types to resolve the signature of the
            method in the CALL or REQUEST Child Tags:
        GET, FIND, REQUEST, CONSTANT, ARRAY, ANY, ALL, or NOT may provide the arguments
-->

<!ELEMENT ARGUMENTS (%compute;)*>
<!ATTLIST ARGUMENTS Classes CDATA #IMPLIED>

<!-- ******************************************************************
    VALUE specifies the value a property or public field is to be set to, or the value that a typed object
        is to be constructed as, allowing for explicit construction or specified by the type Child Tags:
        GET, FIND, REQUEST, CONSTANT, ARRAY, ANY, ALL, or NOT tag must actually construct the value
-->

<!ELEMENT VALUE (%compute;)>

<!-- ******************************************************************
    PARAMS specifies special parameters used by the secondary processors Child Tags:
        PARAM specifies a specific PARAM
-->
<!ELEMENT PARAMS (PARAM*)>

<!-- ******************************************************************
    PARAM a special parameters used by the secondary processors Attributes:
        Name must specify the name of the special parameter
        Value must specify the value of the special parameter
        As may specify the name of a type which the parameter will be converted to
-->
<!ELEMENT PARAM EMPTY>
<!ATTLIST PARAM Name NMTOKEN #REQUIRED
        Value CDATA #REQUIRED
        As CDATA #IMPLIED>
```

We claim:

1. A computer-implemented method for creating and configuring a component-based application, the method comprising the steps of:
   receiving an application description file containing a definition of a component-based application;
   generating, in a memory, a representation of a parse tree based on the application description file, the parse tree comprising at least one leaf;
   for each of a first subset of the leaves,
      mapping the leaf to a target class; and
      instantiating a component associated with the target class; and
   for at least a subset of the instantiated components, invoking at least one method of the component to launch the application.

2. The method of claim 1, wherein the step of generating a representation of a parse tree comprises parsing the application description file.

3. The method of claim 1, wherein the application description filed is a text-based, extensible markup language (XML) compliant document, and the parse tree is created by an XML parser.

4. The method of claim 1, wherein the at least one leaf comprises a data object from the group of data objects consisting of comments, processing instructions, elements, and raw data.

5. The method of claim 1, wherein the component is an instance of a class in an application framework.

6. The method of claim 1, wherein at least one leaf comprises an element including an attribute list comprising at least one attribute, the method further comprising the step of:
   mapping at least one attribute in the attribute list of at least one leaf to a property of the component associated with the target class to which the leaf is mapped.

7. The method of claim 1, wherein the components comprise at least one parent component and at least one child component, and wherein the step instantiating a component comprises instantiating at least one child component before instantiating at least one parent component using a post-order recursive traversal of the parse tree.

8. The method of claim 1, wherein each leaf comprises a tag, and the step of mapping the leaf to a target class comprises the steps of:
   comparing the tag of the leaf with a plurality of target class names in an application framework; and
   selecting a target class with a matching name.

9. The method of claim 1, wherein the instantiating step comprises the steps of:
   creating an element processor for the element, the element processor being associated with the target class; and
   creating an uninitialized instance of the target class.

10. The method of claim 6, wherein each attribute comprises a name, and the step of mapping the at least one attribute to a property of the component comprises the steps of:
    for each attribute in the attribute list,
       searching an element mapper for a property descriptor having a name that matches the name of the attribute;
       responsive to a match being found, obtaining a write method for the component property from the matching property descriptor; and
       executing the write method to write the attribute to the component property.

11. The method of claim 10, wherein the write method comprises a parameter associated with the attribute, and the executing step comprises the steps of:
    determining whether the parameter is of a same type as the attribute;
    responsive to the parameter being a different type,
       converting the type of the attribute to the type of the parameter; and executing the write method with the attribute as the parameter.

12. The method of claim 1, further comprising the steps of:
    for each component,
       initializing the component; and
       responsive to the component having a parent component, adding the component to the parent component.

13. A system for creating and configuring a component-based application, the system comprising:
    at least one element processor for reading a parse tree comprising at least one element, and for at least a subset of the elements of the parse tree, transforming the element into a component in an application framework, and for transforming the component into a running application;
    an element mapper, coupled to the at least one element processor, for mapping the element to a target class; and
    an attribute mapper, coupled to the at least one element processor, for mapping an attribute of the element to a property of the component;
    wherein the element processor transforms the element into the component by calling the element mapper to map the element, and instantiating the component.

14. The system of claim 13, wherein the element comprises:
    a tag for identifying the element; and
    an attribute list comprises a number of attributes corresponding to component properties.

15. The system of claim 13, wherein each attribute and property comprise a type, and the system further comprises:
    a parameter converter, coupled to the attribute mapper, for converting the type of the attribute to the type of the component property.

16. The system of claim 13, further comprising
    a parser, coupled to the at least one element processor, for creating a parse tree from an application description file comprising a text-based attribute grammar.

17. The system of claim 16, wherein the application description file is an XML-compliant, text-based document, and the parser is an XML parser.

18. The system of claim 13, wherein the attribute mapper comprises a plurality of property descriptors, each property descriptor comprising a name and a write method for writing an attribute to component property.

19. A computer-readable medium having computer-readable program code devices embodied therein for creating and configuring a component-based application, the computer-readable medium comprising:
    computer-readable program code devices configured to receive an application description file containing a definition of a component-based application;

computer-readable program code devices configured to generate, in a memory, a representation of a parse tree based on the application description file, the parse tree comprising at least one leaf;

computer-readable program code devices configured to, for each of a first subset of the leaves, map the leaf to a target class; and instantiate a component associated with the target class; and computer-readable program code devices configured to, for at least a subset of the instantiated components, invoke at least one method of the component to launch the application.

20. The computer-readable medium of claim 19, wherein an element includes an attribute list comprising at least one attributes, further comprising:

computer-readable program code devices configured to map at least one attribute in the attribute list to a property of the component associated with the target class to which the leaf is mapped.

21. The computer-readable medium of claim 20, wherein at least one element comprises a tag, and the computer-readable program code devices configured to map the element to a target class comprise:

computer-readable program code devices configured to compare the tag of the element with a plurality of target class names in an application framework; and computer-readable program code devices configured to select a target class with a matching name.

22. The computer-readable medium of claim 19, wherein the computer-readable program code devices configured to instantiate a component of the target class comprise:

computer-readable program code devices configured to create an element processor for the element, the element processor being associated with the target class; and computer-readable program code devices configured to create an uninitialized instance of the target class.

23. The computer-readable medium of claim 20, wherein an attribute comprises a name, and the computer-readable program code devices configured to map at least one attribute in the attribute list to a property of the component comprise:

computer-readable program code devices configured, for each attribute in the attribute list, to:
search an element mapper for a property descriptor having a name that matches the name of the attribute;
responsive to a match being found, obtain a write method for the component property from the matching property descriptor; and
execute the write method to write the attribute to the component property.

24. The computer-readable medium of claim 19, further comprising:

computer-readable program code devices configured, for each component, to:
initialize the component; and
responsive to the component having a parent component, add the component to the parent component.

* * * * *